US011979035B2

United States Patent
Hamana et al.

(10) Patent No.: US 11,979,035 B2
(45) Date of Patent: May 7, 2024

(54) WIRELESS POWER TRANSMISSION SYSTEM FOR WIRELESSLY TRANSMITTING POWER TO PREVENT POWER SHORTAGE IN LOAD DEVICE OF WIRELESS POWER RECEIVING APPARATUS

(71) Applicant: OMRON Corporation, Kyoto (JP)

(72) Inventors: Kentaro Hamana, Kyoto (JP); Tetsuya Nosaka, Kyoto (JP); Manh Tai Nguyen, Kyoto (JP); Akito Murai, Kyoto (JP); Yoshiki Sugimoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 144 days.

(21) Appl. No.: 17/629,929

(22) PCT Filed: Aug. 19, 2019

(86) PCT No.: PCT/JP2019/032283
§ 371 (c)(1),
(2) Date: Jan. 25, 2022

(87) PCT Pub. No.: WO2021/033236
PCT Pub. Date: Feb. 25, 2021

(65) Prior Publication Data
US 2022/0294273 A1 Sep. 15, 2022

(51) Int. Cl.
*H02J 50/40* (2016.01)
*H02J 7/00* (2006.01)
(Continued)

(52) U.S. Cl.
CPC .......... *H02J 50/80* (2016.02); *H02J 7/00034* (2020.01); *H02J 50/005* (2020.01); *H02J 50/20* (2016.02); *H02J 50/40* (2016.02)

(58) Field of Classification Search
CPC .... H02J 7/00034; H02J 7/00712; H02J 50/10; H02J 50/12; H02J 50/20; H02J 50/40;
(Continued)

(56) References Cited

U.S. PATENT DOCUMENTS

| 8,290,531 B2 | 10/2012 | Wakamatsu | |
|---|---|---|---|
| 2009/0133942 A1* | 5/2009 | Iisaka | H02J 50/10 |
| | | | 320/108 |

(Continued)

FOREIGN PATENT DOCUMENTS

| JP | 2009268311 A | 11/2009 |
|---|---|---|
| JP | 2014505460 A | 2/2014 |
| JP | 2018102087 A | 6/2018 |

OTHER PUBLICATIONS

International Search Report for International Application No. PCT/JP2019/032283; dated Oct. 15, 2019.
(Continued)

*Primary Examiner* — Levi Gannon
(74) *Attorney, Agent, or Firm* — CANTOR COLBURN LLP

(57) ABSTRACT

A wireless power transmitting apparatus is provided with: a power transmitting circuit for transmitting power for a load device to a wireless power receiving apparatus; a signal transmitting circuit for transmitting a control signal for the load device to the wireless power receiving apparatus; a signal receiving circuit for obtaining an estimated received power level indicating a level of the power transmitted from the wireless power transmitting apparatus and received by the wireless power receiving apparatus; and a control circuit. The control circuit periodically allocates time slots to wireless power receiving apparatuses for wireless power transmission. When the received power level is smaller than a threshold in a first time slot allocated to one wireless power receiving apparatus, the control circuit extends a second time slot allocated to the one wireless power receiving apparatus, the second time slot preceding or following the first time slot.

7 Claims, 15 Drawing Sheets

(51) Int. Cl.
   *H02J 50/00* (2016.01)
   *H02J 50/20* (2016.01)
   *H02J 50/80* (2016.01)

(58) Field of Classification Search
   CPC ..... H02J 50/80; H04B 5/0031; H04B 5/0037; H04B 5/0093
   See application file for complete search history.

(56) References Cited

U.S. PATENT DOCUMENTS

| | | |
|---|---|---|
| 2009/0271048 A1 | 10/2009 | Wakamatsu |
| 2012/0062203 A1* | 3/2012 | Kim .................. H02J 50/40 323/304 |
| 2012/0202435 A1 | 8/2012 | Kim et al. |
| 2012/0280575 A1* | 11/2012 | Kim .................. H02J 50/80 307/104 |
| 2014/0339909 A1* | 11/2014 | Sugawara ............ H02J 50/80 307/104 |
| 2016/0087448 A1* | 3/2016 | Takahashi ............ H02J 50/60 307/104 |
| 2018/0301939 A1* | 10/2018 | Byun .................. H02J 7/00034 |
| 2021/0143680 A1* | 5/2021 | Nakanishi ............ H02J 50/12 |

OTHER PUBLICATIONS

PCT Written Opinion of the International Searching Authority for International Application No. PCT/JP2019/032283; dated Oct. 15, 2019.

EPO Extended European Search Report for corresponding EP Application No. 19942087.8; dated May 9, 2023.

* cited by examiner

WIRELESS POWER TRANSMISSION SYSTEM FOR WIRELESSLY TRANSMITTING POWER TO PREVENT POWER SHORTAGE IN LOAD DEVICE OF WIRELESS POWER RECEIVING APPARATUS

CROSS REFERENCE TO RELATED APPLICATIONS

This is the U.S. national stage of application No. PCT/JP2019/032283, filed on Aug. 19, 2019. Priority is claimed and the disclosure of which is also incorporated herein by reference.

TECHNICAL FIELD

The present disclosure relates to a wireless power transmission system including a wireless power transmitting apparatus, and a wireless power receiving apparatus, and also relates to the wireless power transmitting apparatus of the wireless power transmission system.

BACKGROUND ART

There has been known a wireless power transmission system for wirelessly transmitting power from a power transmitting apparatus connected to a power source, to a power receiving apparatus including a load device, such as a rechargeable battery. For example, in a sensor network including a plurality of sensors, a wireless power transmission system including a wireless power transmitting apparatus and a wireless power receiving apparatus is constructed in order to supply power to the sensors.

When a radio wave propagation environment around the wireless power transmitting apparatus and/or the wireless power receiving apparatus is constantly changing due to movement of a person or an item, it is necessary to adjust operating parameters of the wireless power transmitting apparatus or the wireless power receiving apparatus in accordance with the changes in the radio wave propagation environment.

Patent Document 1 discloses a power transmitting apparatus configured to increase transmitting power in accordance with surrounding conditions.

CITATION LIST

Patent Documents

PATENT DOCUMENT 1: Japanese Patent Laid-open Publication No. JP 2018-102087 A

SUMMARY OF INVENTION

Technical Problem

Power transmission from the wireless power transmitting apparatus to the wireless power receiving apparatus may temporarily fail due to changes in the radio wave propagation environment, and as a result, the load device may not operate normally due to power shortage. For example, in the case where the load device is a sensor, malfunction of the sensor causes an error in a measured value, resulting in malfunction of other apparatuses using the measured value of the sensor (e.g., a manufacturing apparatus in a factory, or the like). Therefore, regardless of changes in the radio wave propagation environment, it is required to wirelessly transmit power from the wireless power transmitting apparatus to the wireless power receiving apparatus, so that the load device is less likely to fail due to power shortage.

An object of the present disclosure is to provide a wireless power transmitting apparatus capable of wirelessly transmitting power to a wireless power receiving apparatus so that a load device is less likely to fail due to power shortage. In addition, another object of the present disclosure is to provide a wireless power transmission system including such a wireless power transmitting apparatus.

Solution to Problem

According to a wireless power transmitting apparatus of an aspect of the present disclosure, the wireless power transmitting apparatus wirelessly transmits power to at least one wireless power receiving apparatus. The wireless power receiving apparatus is provided with a load device configured to operate with power of a power storage device. The wireless power transmitting apparatus is provided with: a power transmitting circuit configured to transmit power for operating the load device, to the wireless power receiving apparatus; a signal transmitting circuit configured to transmit a control signal to control the load device, to the wireless power receiving apparatus; a signal receiving circuit configured to obtain an estimated value of a received power level indicating a level of the power transmitted from the wireless power transmitting apparatus and received by the wireless power receiving apparatus; and a control circuit configured to control operation of the wireless power transmitting apparatus. The control circuit periodically allocates a plurality of time slots to the wireless power receiving apparatus, so that in each of the plurality of time slots, the wireless power transmitting apparatus wirelessly transmits the power to the wireless power receiving apparatus. When the received power level is smaller than a predetermined threshold in a first time slot allocated to one wireless power receiving apparatus, the control circuit extends a second time slot allocated to the one wireless power receiving apparatus, the second time slot preceding or following the first time slot.

With such a configuration, it is possible to wirelessly transmit power from the wireless power transmitting apparatus to the wireless power receiving apparatus, so that the load device is less likely to fail due to power shortage.

According to a wireless power transmitting apparatus of an aspect of the present disclosure, the wireless power transmitting apparatus wirelessly transmits power to at least one wireless power receiving apparatus. The wireless power receiving apparatus is provided with a load device configured to operate with power of a power storage device. The wireless power transmitting apparatus is provided with: a power transmitting circuit configured to transmit power for operating the load device, to the wireless power receiving apparatus; a signal transmitting circuit configured to transmit a control signal to control the load device, to the wireless power receiving apparatus; a signal receiving circuit configured to obtain an estimated value of a received power level indicating a level of the power transmitted from the wireless power transmitting apparatus and received by the wireless power receiving apparatus; and a control circuit configured to control operation of the wireless power transmitting apparatus. When a transition occurs from a state where the received power level is smaller than a predetermined threshold, to a state where the received power level is equal to or higher than the threshold, the control circuit waits for a predetermined standby time, and then transmits the control signal to operate the load device, using the signal transmitting circuit.

With such a configuration, it is possible to wirelessly transmit power from the wireless power transmitting apparatus to the wireless power receiving apparatus, so that the load device is less likely to fail due to power shortage.

According to a wireless power transmission system of an aspect of the present disclosure, the wireless power transmission system is provided with: the wireless power transmitting apparatus; and at least one wireless power receiving apparatus provided with a load device configured to operate with power of a power storage device.

With such a configuration, for example, it is possible to supply power to a plurality of sensors in a sensor network including the sensors.

Advantageous Effects of Invention

According to the wireless power transmission system according to the aspect of the present disclosure, it is possible to wirelessly transmit power from the wireless power transmitting apparatus to the wireless power receiving apparatus, so that the load device is less likely to fail due to power shortage.

DESCRIPTION OF EMBODIMENTS

Figure 1:
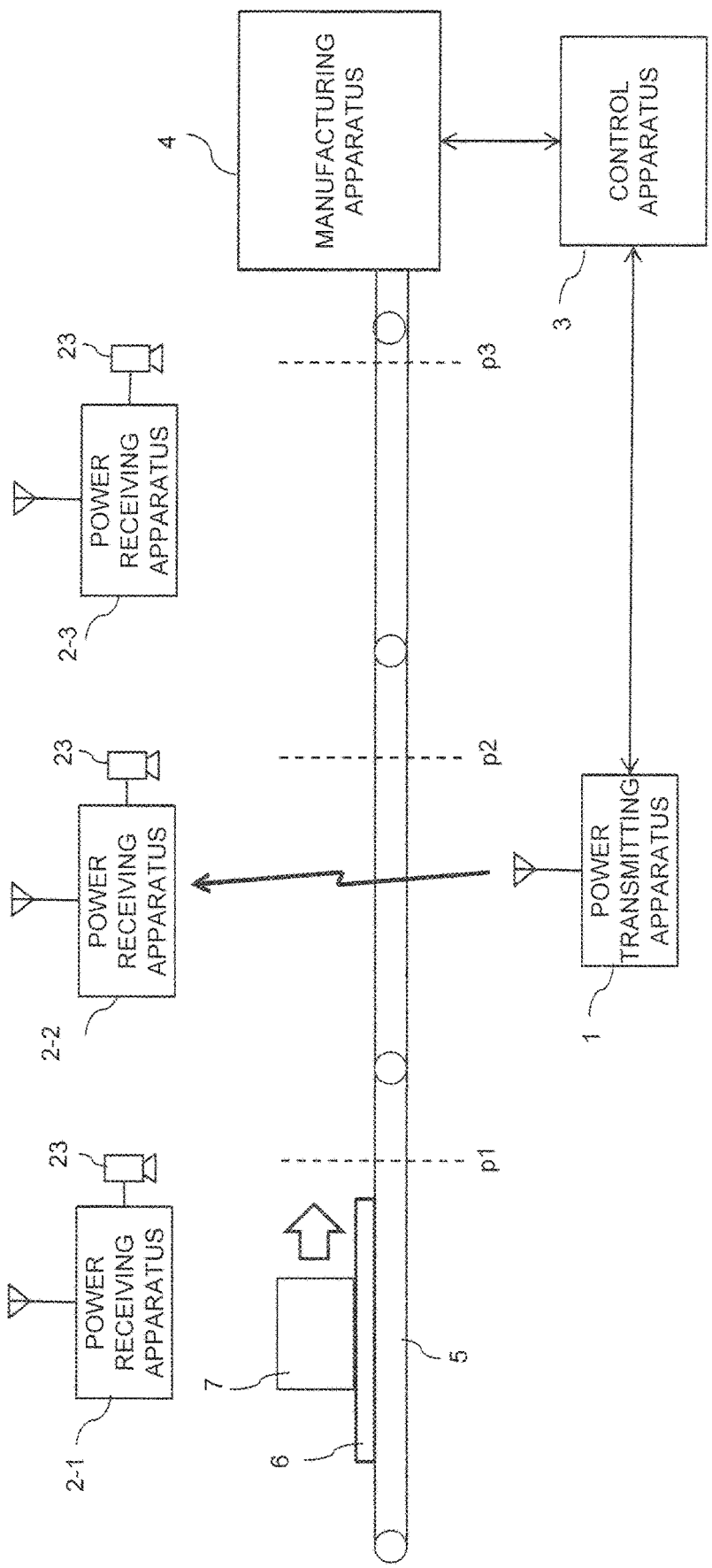
FIG. 1 is a schematic diagram showing a configuration of a system including a wireless power transmission system according to a first embodiment.

Hereinafter, embodiments according to one aspect of the present disclosure (hereinafter, also referred to as "the present embodiment") will be described with reference to the drawings. In the drawings, the same reference sign indicates similar components.

First Embodiment

A wireless power transmission system according to a first embodiment will be described with reference to FIGS. 1 to 11.

Application Example of First Embodiment

FIG. 1 is a schematic diagram showing a configuration of a system including a wireless power transmission system according to the first embodiment. The wireless power transmission system of FIG. 1 includes a wireless power transmitting apparatus 1 and at least one wireless power receiving apparatus 2-1 to 2-3, and wirelessly transmits power from the wireless power transmitting apparatus 1 to the wireless power receiving apparatuses 2-1 to 2-3.

Hereinafter, the wireless power receiving apparatuses 2-1 to 2-3 are collectively referred to as "wireless power receiving apparatus 2". Although FIG. 1 shows a case where the wireless power transmission system includes the three wireless power receiving apparatuses 2, the wireless power transmission system may include any number of wireless power receiving apparatuses 2. In addition, hereinafter, the wireless power transmitting apparatus 1 is referred to as a "power transmitting apparatus 1", and the wireless power receiving apparatus 2 is referred to as a "power receiving apparatus 2".

Figure 2:
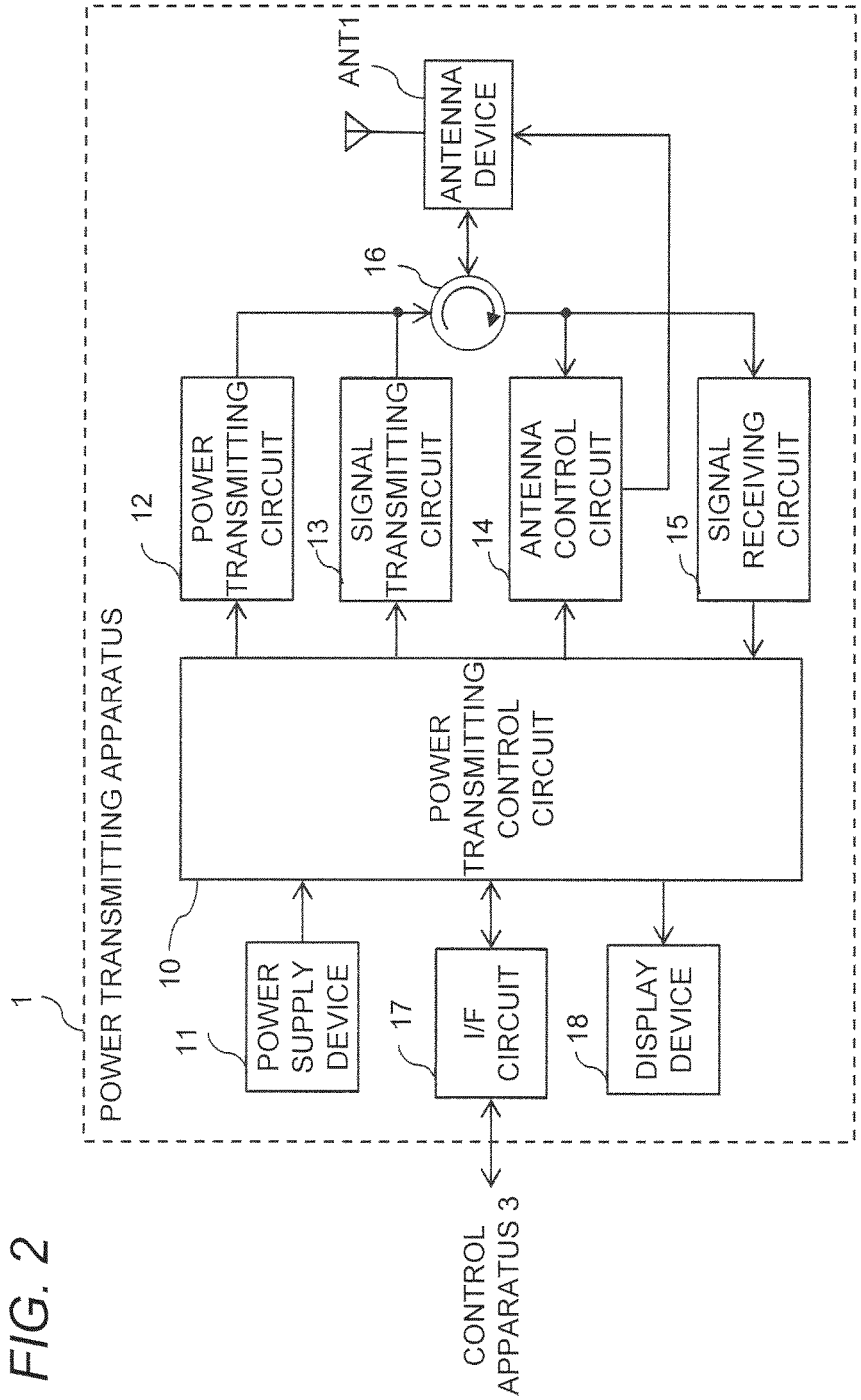
FIG. 2 is a block diagram showing a configuration of a wireless power transmitting apparatus 1 of FIG. 1.

FIG. 2 is a block diagram showing a configuration of the power transmitting apparatus 1 of FIG. 1. The power transmitting apparatus 1 is provided with at least a power transmitting control circuit 10, a power transmitting circuit 12, a signal transmitting circuit 13, and a signal receiving circuit 15. The power transmitting control circuit 10 is a control circuit of the power transmitting apparatus 1, that controls overall operations of the power transmitting apparatus 1. The power transmitting circuit 12 transmits power for operating a sensor 23 (described below) of the power receiving apparatus 2, to the power receiving apparatus 2. The signal transmitting circuit 13 transmits a control signal to the power receiving apparatus 2 to control the sensor 23. The signal receiving circuit 15 obtains an estimated value of a received power level indicating a level of the power transmitted from the power transmitting apparatus 1 and received by the power receiving apparatus 2.

Figure 3:
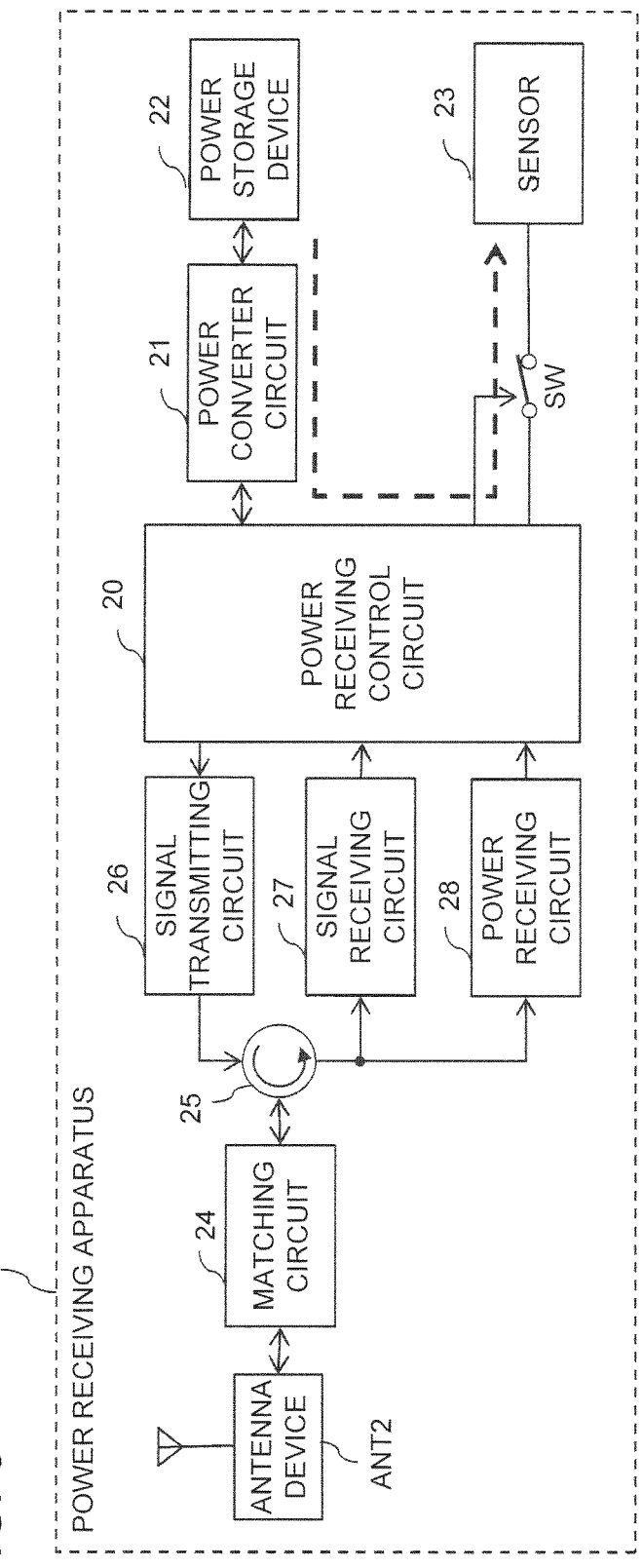
FIG. 3 is a block diagram showing a configuration of a wireless power receiving apparatus 2 of FIG. 1.

FIG. 3 is a block diagram showing a configuration of the power receiving apparatus 2 of FIG. 1. The power receiving apparatus 2 is provided with at least a power storage device 22 and a sensor 23. The power storage device 22 stores the power wirelessly transmitted from the power transmitting apparatus 1 to the power receiving apparatus 2. The power storage device 22 includes, for example, a rechargeable battery or a capacitor. The sensor 23 is a load device operable with the power stored in the power storage device 22.

When a transition occurs from a state where the received power level is smaller than a predetermined threshold Th1, to a state where the received power level is equal to or higher than the threshold Th1, the power transmitting control circuit 10 waits for a predetermined standby time Tw, and then transmits the control signal to operate the sensor 23, using the signal transmitting circuit 13.

When the power storage device 22 has a charging voltage higher than a predetermined threshold Th2, the power storage device 22 can supply the sensor 23 with power allowing the sensor 23 to operate stably. The threshold Th1 of the received power level may be set, for example, so that the charging voltage of the power storage device 22 reaches the threshold Th2 after a sufficiently long time has elapsed.

For example, when an obstacle passes through between the power transmitting apparatus 1 and the power receiving apparatus 2, radio waves are blocked, the received power level decreases, and the charging voltage of the power storage device 22 also decreases. Once the power transmission is interrupted, and the charging voltage of the power storage device 22 decreases below the threshold Th2, even when the power transmission is resumed, it takes some time dependent on a time constant of the circuit, for the charging voltage of the power storage device 22 to becomes equal to or higher than the threshold Th2. Therefore, the standby time Tw is set to, for example, a time length during which the charging voltage of the power storage device 22 increases from zero to the threshold Th2, when the power receiving apparatus 2 is receiving the power at a standard received power level higher than the threshold Th1.

According to the wireless power transmission system of the first embodiment, when a transition occurs from the state where the received power level is smaller than the threshold Th1, to the state where the received power level is equal to or higher than the threshold Th1, the control signal to operate the sensor 23 is transmitted after the standby time Tw has elapsed, as described above. At this time, since it is considered that the charging voltage of the power storage device 22 is equal to or higher than the threshold Th2, it is possible to supply the sensor 23 with the power allowing the sensor 23 to operate stably. As a result, it is possible to wirelessly transmit the power from the power transmitting apparatus 1 to the power receiving apparatus 2 so that the sensor 23 is less likely to fail due to power shortage.

The control signal to operate the sensor 23 may include, for example, turning on the sensor 23, measuring a predetermined physical quantity by the sensor 23, reading the physical quantity measured by the sensor 23, and the like.

Configuration Example of First Embodiment

Referring to the example of FIG. 1, the power transmitting apparatus 1 and the power receiving apparatuses 2-1 to 2-3 are provided in a factory including a control apparatus 3, a manufacturing apparatus 4, and a belt conveyor 5. The belt conveyor 5 conveys a pallet 6 and a workpiece 7. The pallet 6 and the workpiece 7 are moved by the belt conveyor 5 so as to arrive at predetermined positions p1 to p3 at predetermined times. At each of the positions p1 to p3, a predetermined work event is executed on the workpiece 7. The power receiving apparatuses 2-1 to 2-3 are provided near the positions p1 to p3, respectively, and are associated with the events executed at the positions p1 to p3, respectively. The sensors 23 of the power receiving apparatuses 2-1 to 2-3 measure predetermined physical quantities associated with these events. The power transmitting apparatus 1 collects the measured physical quantities from the power receiving apparatus 2-1 to 2-3, and sends the physical quantities to the control apparatus 3. The control apparatus 3 controls operations of the manufacturing apparatus 4 based on the measured physical quantity. The control apparatus 3 is, for example, a programmable logic controller. The manufacturing apparatus 4 executes a predetermined work event (e.g., a fabrication process, such as welding) on the workpiece 7.

The power transmitting apparatus 1 is connected to the control apparatus 3 and the manufacturing apparatus 4 as external apparatuses.

Referring to FIG. 2, the power transmitting apparatus 1 is provided with the power transmitting control circuit 10, a power supply device 11, the power transmitting circuit 12, the signal transmitting circuit 13, an antenna control circuit 14, the signal receiving circuit 15, a circulator 16, an antenna device ANT1, and an interface (I/F) circuit 17, and a display device 18.

The power transmitting control circuit 10 controls the overall operations of the power transmitting apparatus 1, as described above.

The power supply device 11 supplies power to be transmitted to the power receiving apparatus 2.

The power transmitting circuit 12 transmits the power for operating the sensor 23 of the power receiving apparatus 2 as described above, to the power receiving apparatus 2, via the circulator 16 and the antenna device ANT1. The power transmitting circuit 12 generates, for example, a continuous wave (CW) from the power supplied by the power supply device 11.

The signal transmitting circuit 13 transmits the control signal to control the sensor 23 (e.g., a read signal of the sensor 23), to the power receiving apparatus 2, via the circulator 16 and the antenna device ANT1. The signal receiving circuit 15 receives, for example, a response signal including the physical quantity measured by the sensor 23, from the power receiving apparatus 2, via the antenna device ANT1 and the circulator 16. In addition, the signal receiving circuit 15 obtains the estimated value of the received power level, as described above. The estimated value of the received power level may be generated by the power transmitting apparatus 1 as described below, or may be generated by the power receiving apparatus 2 and received from the power receiving apparatus 2 via the antenna device ANT1 and the circulator 16.

The antenna device ANT1 has variable directivity (directional pattern). The antenna device ANT1 is, for example, an array antenna including a plurality of antenna elements, and its directivity changes by individually adjusting amplitudes and phases of signals transmitted or received by the antenna elements. The antenna control circuit 14 controls the directivity of the antenna device ANT1 under the control of the power transmitting control circuit 10.

The circulator 16 combines and separates the power and the signal transmitted to the power receiving apparatus 2 via the antenna device ANT1, with/from the signal received from the power receiving apparatus 2 via the antenna device ANT1.

The interface circuit 17 is connected to the control apparatus 3 via a wired or wireless communication line. As will be described below, the power transmitting control circuit 10 generates a state signal indicating whether or not the sensor 23 is operable, and outputs the state signal to the control apparatus 3 via the interface circuit 17. In addition, as will be described below, the power transmitting control circuit 10 generates a read result signal including the physical quantity measured by the sensor 23, and transmits the read result signal to the control apparatus 3 via the interface circuit 17.

The display device 18 displays a state of the power transmitting apparatus 1, and a state of the power receiving apparatus 2 (the received power level, and the like) communicably connected to the power transmitting apparatus 1.

Referring to FIG. 3, the power receiving apparatus 2 is provided with a power receiving control circuit 20, a power converter circuit 21, the power storage device 22, the sensor 23, a matching circuit 24, a circulator 25, a signal transmitting circuit 26, a signal receiving circuit 27, a power receiving circuit 28, and an antenna device ANT2, and a switch SW.

The power receiving control circuit 20 controls overall operations of the power receiving apparatus 2.

The antenna device ANT2 has a predetermined directional pattern or omni-directional pattern.

The matching circuit 24 matches an impedance of the antenna device ANT2 with impedances of the circulator 25 and the other circuits.

The circulator 25 combines and separates the power and the signal transmitted from the power transmitting apparatus 1 via the antenna device ANT2, with/from the signal transmitted to the power transmitting apparatus 1 via the antenna device ANT2.

The signal transmitting circuit 26 transmits, for example, the response signal including the physical quantity measured by the sensor 23, via the circulator 25, the matching circuit 24, and the antenna device ANT2. The signal receiving circuit 27 receives the control signal to control the sensor 23, from the power transmitting apparatus 1, via the antenna device ANT2, the matching circuit 24, and the circulator 25.

The power receiving circuit 28 receives the power for operating the sensor 23, from the power transmitting apparatus 1, via the antenna device ANT2, the matching circuit 24, and the circulator 25.

The power converter circuit 21 converts (rectifies) the power wirelessly transmitted from the power transmitting apparatus 1 to the power receiving apparatus 2, from an alternating current to a direct current, and then, boosts or drops the direct current power. The power storage device 22 stores the power wirelessly transmitted from the power transmitting apparatus 1 to the power receiving apparatus 2, and then boosted or dropped by the power converter circuit 21. The power storage device 22 includes, for example, a rechargeable battery or a capacitor.

The sensor 23 operates with the power stored in the power storage device 22, and measures the predetermined physical quantity. The sensor 23 is connected to the power receiving control circuit 20 via the switch SW configured to turn on/off under the control of the power receiving control circuit 20. When the switch SW is turned on, the power is supplied from the power storage device 22 to the sensor 23, and the physical quantity measured by the sensor 23 is sent to the power receiving control circuit 20. The physical quantity measured by the sensor 23 is wirelessly transmitted to the power transmitting apparatus 1.

In order to estimate the received power level, the signal transmitting circuit 26 of the power receiving apparatus 2 may wirelessly transmit a test signal, and the signal receiving circuit 15 of the power transmitting apparatus 1 may wirelessly receive the test signal to measure a received signal intensity of the test signal. The signal receiving circuit 15 of the power transmitting apparatus 1 may measure the received signal intensity of the test signal as it is, or measure a received signal intensity of an amplified test signal, or measure power of the test signal, instead of the received signal intensity of the test signal.

In order to estimate the received power level, the signal transmitting circuit 13 of the power transmitting apparatus 1 may wirelessly transmit a test signal, and the signal receiving circuit 27 of the power receiving apparatus 2 may wirelessly receive the test signal to measure a received signal intensity of the test signal. The signal receiving circuit 27 of the power receiving apparatus 2 may measure the received signal intensity of the test signal as it is, or measure a received signal intensity of an amplified test signal, or measure the power of the test signal, instead of the received signal intensity of the test signal.

In order to estimate the received power level, the signal transmitting circuit 13 of the power transmitting apparatus 1 may wirelessly transmit a test signal, and the signal receiving circuit 15 of the power transmitting apparatus 1 may wirelessly receive the test signal reflected by the power receiving apparatus 2, and measure a received signal intensity of the test signal. In this case, in order to reflect the test signal transmitted from the power transmitting apparatus 1, the power receiving apparatus 2 may be configured, for example, so that impedance mismatching is made selectively in any of the circuit portions under the control of the power receiving control circuit 20.

The test signal may be a communication signal with a predetermined format, or may be a continuous wave (CW). In addition, the test signal may be transmitted in response to a command signal generated by the power transmitting apparatus 1 or the power receiving apparatus 2, or may be transmitted periodically without the command signal.

In order to estimate the received power level, the charging voltage of the power storage device 22 may be measured.

In order to estimate the received power level, the power supplied to the load device of the power receiving apparatus 2, for example, the power converter circuit 21, the power storage device 22, or the sensor 23, may be measured.

Operation Example of First Embodiment

Environments around the power transmitting apparatus 1 and the power receiving apparatuses 2 of FIG. 1 differ in various aspects, between installation of the power transmitting apparatus 1 and the power receiving apparatuses 2 in a factory, and actual operation of the factory. For example, during installation, the manufacturing apparatus 4 and the belt conveyor 5 are stopped, and on the other hand, during operation, the manufacturing apparatus 4 and the belt conveyor 5 are operating, and the pallet 6 and the workpiece 7 pass through near the power transmitting apparatus 1 and the power receiving apparatuses 2

When the environment around the power transmitting apparatus 1 and the power receiving apparatuses 2 change, the radio wave propagation environment also changes. Therefore, even if main beam directions of the antenna devices ANT1 and ANT2 are adjusted during installation, that is, the main beam direction of the antenna device ANT1 of the power transmitting apparatus 1 is adjusted to a position of each of the power receiving apparatuses 2, and the main beam direction of the antenna device ANT2 of each of the power receiving apparatuses 2 is adjusted to a position of the power transmitting apparatus 1, propagation paths of radio waves may change or be blocked during operation. As a result, the received power level of any of the power receiving apparatuses 2 becomes smaller than the threshold Th1, and therefore, the power allowing the sensor 23 to operate stably cannot be supplied to the sensor 23. If the sensor 23 fails due to power shortage, defects may occur in products fabricated by the manufacturing apparatus 4, or malfunction of the manufacturing apparatus 4 may occur.

The wireless power transmission system according to the first embodiment wirelessly transmits the power from the power transmitting apparatus 1 to the power receiving apparatus 2 so that the sensor 23 is less likely to fail due to power shortage, as described below.

Figure 4:
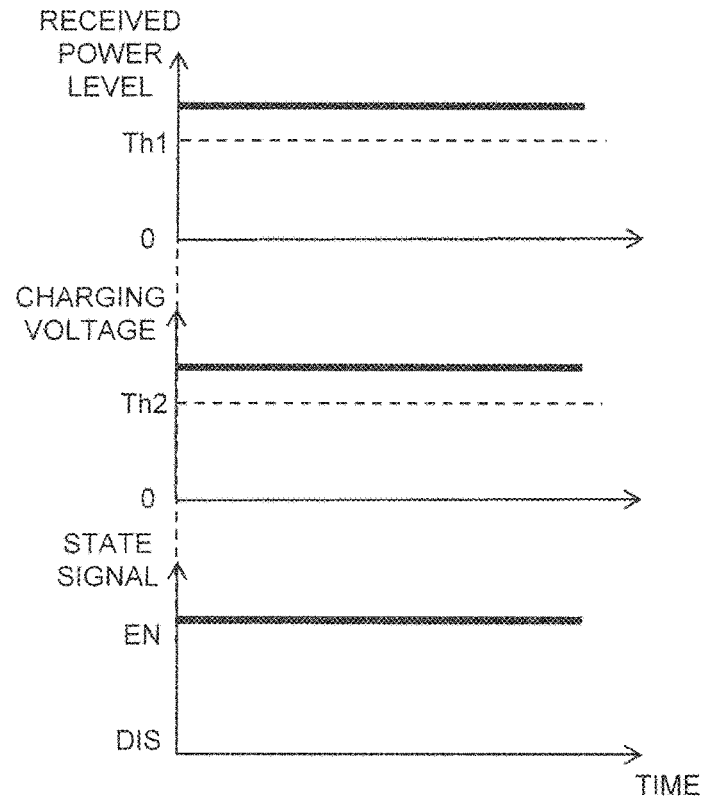
FIG. 4 is a timing chart showing variations in a charging voltage and a state signal, in the case where a received power level of the wireless power receiving apparatus 2 of FIG. 1 constantly exceeds a threshold Th1.

FIG. 4 is a timing chart showing variations in the charging voltage and the state signal, in the case where the received power level of the power receiving apparatus 2 of FIG. 1 constantly exceeds the threshold Th1. The power transmitting control circuit 10 generates the state signal based on the received power level, the state signal indicating whether or not the sensor 23 is operable, that is, whether or not the power allowing the sensor 23 to operate stably can be supplied from the power storage device 22 to the sensor 23. As described above, when the received power level is equal to or higher than the threshold Th1, the charging voltage of the power storage device 22 becomes equal to or higher than the threshold Th2, and therefore, it is possible to supply the sensor 23 with the power allowing the sensor 23 to operate stably. In the example of FIG. 4, the state signal is constantly high, and indicates that the sensor 23 is constantly operable (enabled).

The display device 18 may display at least one of the received power level, the charging voltage, and the state signal shown in FIG. 4.

Figure 5:
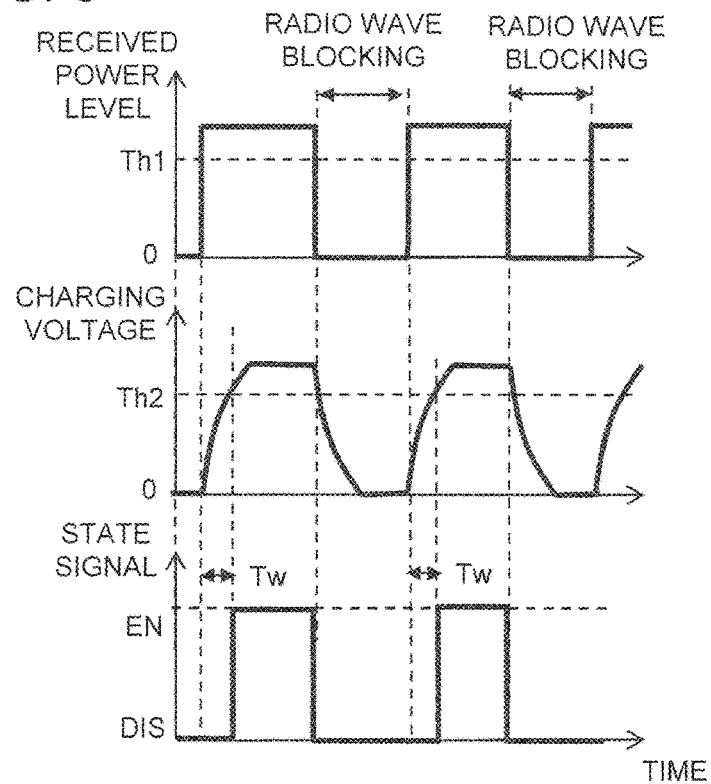
FIG. 5 is a timing chart showing an example of variations in the charging voltage and the state signal, in the case where the received power level of the wireless power receiving apparatus 2 of FIG. 1 becomes smaller than the threshold Th1.

FIG. 5 is a timing chart showing an example of variations in the charging voltage and the state signal, in the case where the received power level of the power receiving apparatus 2 of FIG. 1 becomes smaller than the threshold Th1. As described above, when the factory is in operation, the manufacturing apparatus 4 and the belt conveyor 5 operate, and the pallet 6 and the workpiece 7 pass through near the power transmitting apparatus 1 and the power receiving apparatus 2. As a result, the propagation of radio waves is periodically blocked between the power transmitting apparatus 1 and the power receiving apparatus 2, the received power level periodically decreases below the threshold Th1, and the charging voltage of the power storage device 22 also periodically decreases below the threshold Th2. In this case, the power transmitting control circuit 10 sets the state signal to low. As described above, once the power transmission is interrupted, and the charging voltage of the power storage device 22 decreases below the threshold Th2, even when the power transmission is resumed, it takes some time depending on the time constant of the circuit, for the charging voltage of the power storage device 22 to become equal to or higher than the threshold Th2. Therefore, when the transition occurs from the state where the received power level is smaller than the threshold Th1, to the state where the received power level is equal to or higher than the threshold Th1, the power transmitting control circuit 10 waits for the standby time Tw, and then, transits the state signal from low to high.

Figure 6:
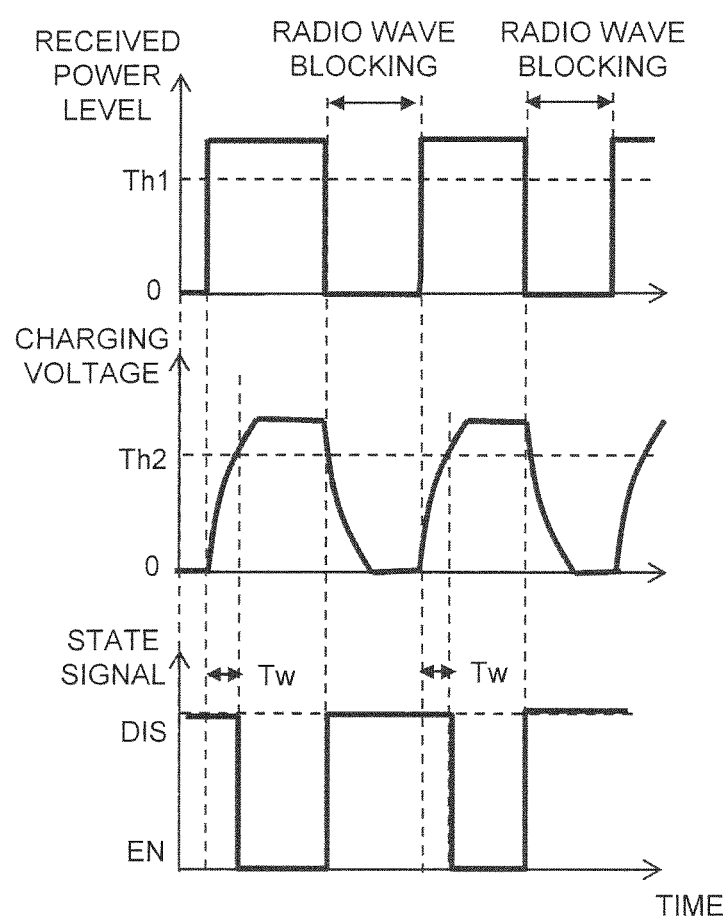
FIG. 6 is a timing chart showing another example of variations in the charging voltage and the state signal, in the case where the received power level of the wireless power receiving apparatus 2 of FIG. 1 becomes smaller than the threshold Th1.

FIG. 6 is a timing chart showing another example of variations in the charging voltage and the state signal, in the case where the received power level of the power receiving apparatus 2 of FIG. 1 becomes smaller than the threshold Th1. The example of FIG. 5 shows that the sensor 23 is operable (enabled) when the state signal is high, and the sensor 23 is inoperable (disabled) when the state signal is low. On the other hand, as shown in FIG. 6, the sensor 23 may be operable (enabled) when the state signal is low, and the sensor 23 may be inoperable (disabled) when the state signal is high.

A plurality of time slots for wirelessly transmitting the power from the power transmitting apparatus 1 to the power receiving apparatuses 2 are periodically allocated to the power receiving apparatuses 2. In each one of the time slots, the following steps are executed in a time-division manner:
(1) estimating the received power level (i.e., transmitting and receiving the test signal),
(2) wirelessly transmitting the power, and
(3) transmitting and receiving the control signal to control the sensor 23, and the measured physical quantity.

Referring to FIGS. 4 to 6, and others, only the step of wirelessly transmitting the power is shown, and the step of transmitting and receiving the other signals are omitted for ease of illustration.

Figure 7:
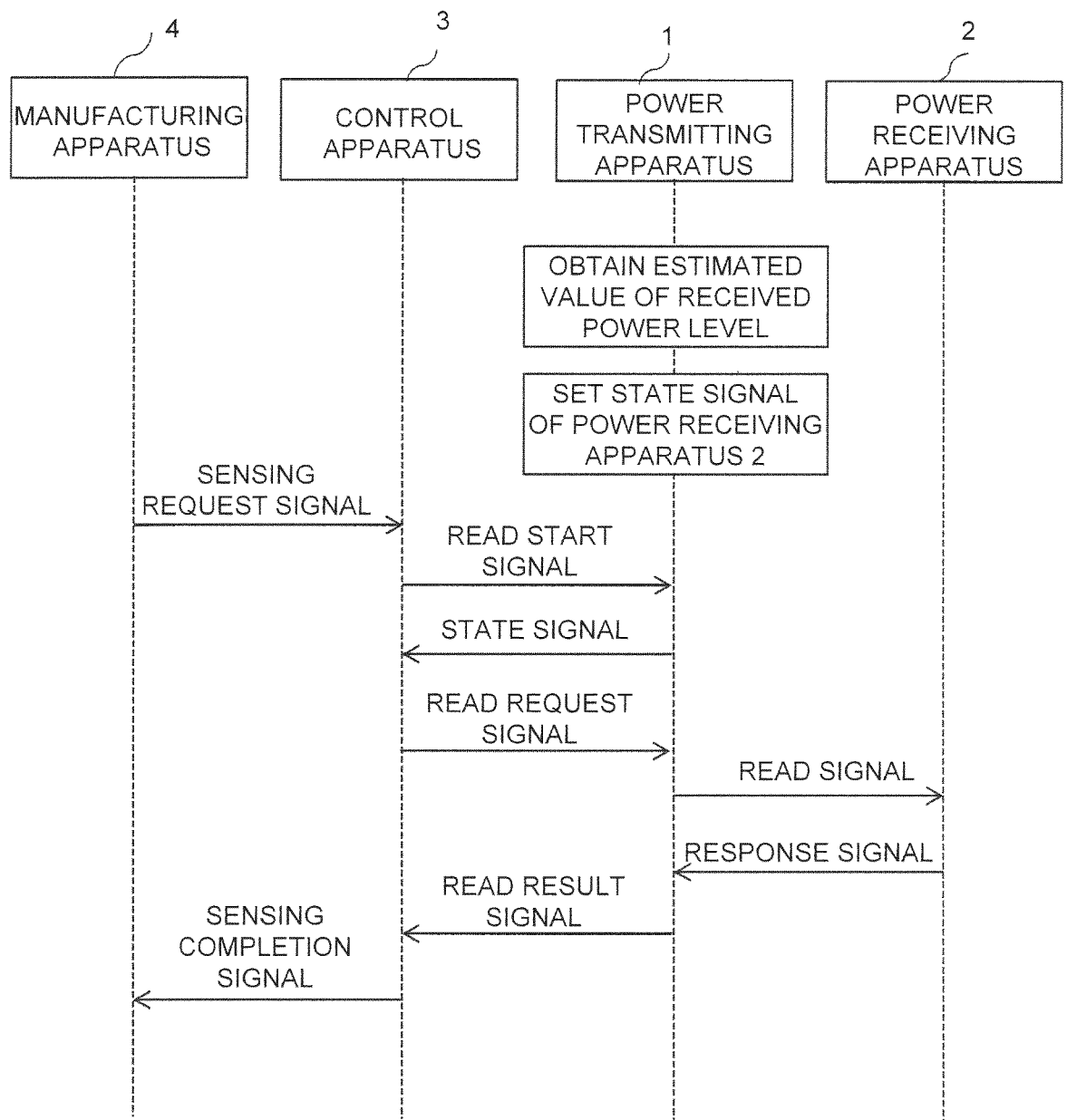
FIG. 7 is a sequence diagram showing one example of operation of the system of FIG. 1.

FIG. 7 is a sequence diagram showing one example of operation of the system of FIG. 1.

The power transmitting apparatus 1 obtains the estimated values of the received power levels of the power receiving apparatuses 2 in advance, and sets the state signals of the power receiving apparatuses 2 based on the received power levels.

When the manufacturing apparatus 4 itself is ready to operate, the manufacturing apparatus 4 transmits a sensing request signal to the control apparatus 3 to operate the sensors 23 of the power receiving apparatuses 2.

Next, the control apparatus 3 transmits a read start signal to the power transmitting apparatus 1 to start reading the measured value of the sensor 23. Next, the power transmitting apparatus 1 transmits the state signal to the control apparatus 3. When the sensor 23 is inoperable (disabled), the control apparatus 3 repeatedly transmits the read start signal to the power transmitting apparatus 1, until the sensor 23 becomes operable (enabled). When the sensor 23 is operable (enabled), the control apparatus 3 transmits a read request signal to the power transmitting apparatus 1 to request the power transmitting apparatus 1 to read the measured values of the sensors 23.

Next, the power transmitting apparatus 1 transmits the read signal to the power receiving apparatus 2 to read the measured value of the sensor 23. Next, the power receiving apparatus 2 transmits the response signal to the power transmitting apparatus 1, the response signal including the physical quantity measured by the sensor 23. Next, the power transmitting apparatus 1 transmits the read result signal to the control apparatus 3, the read result signal including the physical quantity measured by the sensor 23.

Next, the control apparatus 3 determines whether or not the physical quantity measured by the sensor 23 satisfies a predetermined criterion (e.g., a criterion indicating that the manufacturing apparatus 4 may operate), and transmits a sensing completion signal including a result of the determination, to the manufacturing apparatus 4. Thereafter, the control apparatus 3 transmits a control signal to the manufacturing apparatus 4 to control the manufacturing apparatus 4.

Figure 8:
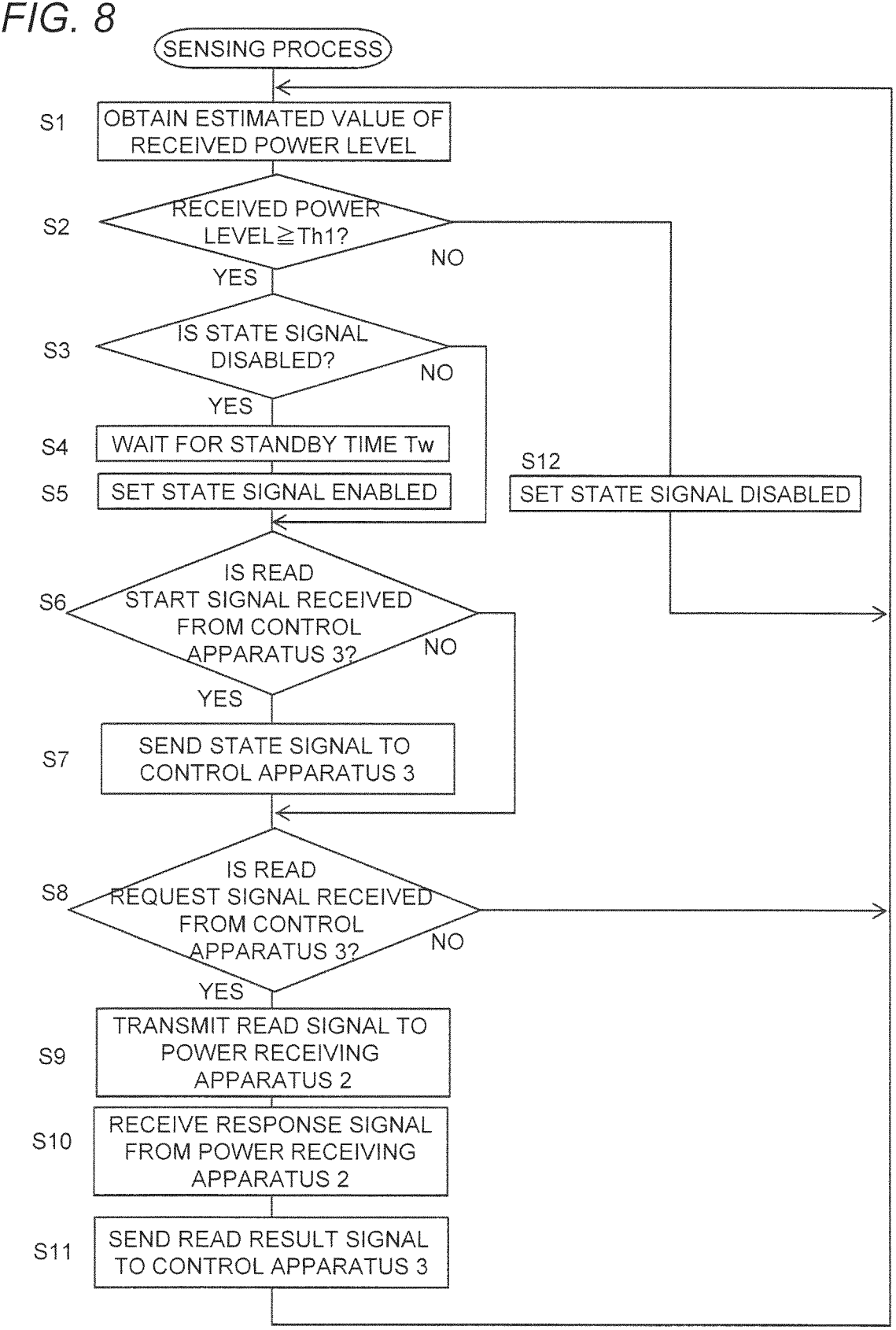
FIG. 8 is a flowchart showing sensing process executed by the power transmitting control circuit 10 of the wireless power transmitting apparatus 1 of FIG. 1.

FIG. 8 is a flowchart showing sensing process executed by the power transmitting control circuit 10 of the power transmitting apparatus 1 of FIG. 1.

In step S1, the power transmitting control circuit 10 obtains the estimated values of the received power levels of the power receiving apparatuses 2, using the signal receiving circuit 15. In step S2, the power transmitting control circuit 10 determines whether or not the received power level is equal to or higher than the threshold Th1; if YES, the process proceeds to step S3, and if NO, the process proceeds to step S12.

In step S3, the power transmitting control circuit 10 determines whether or not the state signal indicates "disabled"; if YES, the process proceeds to step S4, and if NO, the process proceeds to step S6. If YES in step S3, then in step S4, the power transmitting control circuit 10 waits for the standby period Tw, while the state signal remains indicating "disabled", and in step S5, the power transmitting control circuit 10 transitions indication of the state signal from "disabled" to "enabled". On the other hand, if NO in step S3, the power transmitting control circuit 10 keeps the state signal indicating "enabled".

In step S6, the power transmitting control circuit 10 determines whether or not the read start signal has been received from the control apparatus 3; if YES, the process proceeds to step S7, and if NO, the process proceeds to step S8. In step S7, the power transmitting control circuit 10 transmits a state signal to the control apparatus 3.

In step S8, the power transmitting control circuit 10 determines whether or not the read request signal has been received from the control apparatus 3; if YES, the process proceeds to step S9, and if NO, the process returns to step S1. In step S9, the power transmitting control circuit 10 transmits the read signal to the power receiving apparatus 2. When the power receiving control circuit 20 receives the read signal, the power receiving control circuit 20 obtains the physical quantity measured by the sensor 23. In step S10, the power transmitting control circuit 10 receives the response signal from the power receiving apparatus 2, the response signal including the physical quantity measured by the sensor 23. In step S11, the power transmitting control circuit 10 transmits the read result signal to the control apparatus 3, the read result signal including the physical quantity measured by the sensor 23.

If NO in step S2, then in step S12, the power transmitting control circuit 10 sets the indication of the state signal to "disabled".

According to the wireless power transmission system of the first embodiment, by executing the process of FIGS. 7 and 8, it is possible to wirelessly transmit the power from the power transmitting apparatus 1 to the power receiving apparatus 2 so that the sensor 23 is less likely to fail due to power shortage.

Figure 9:
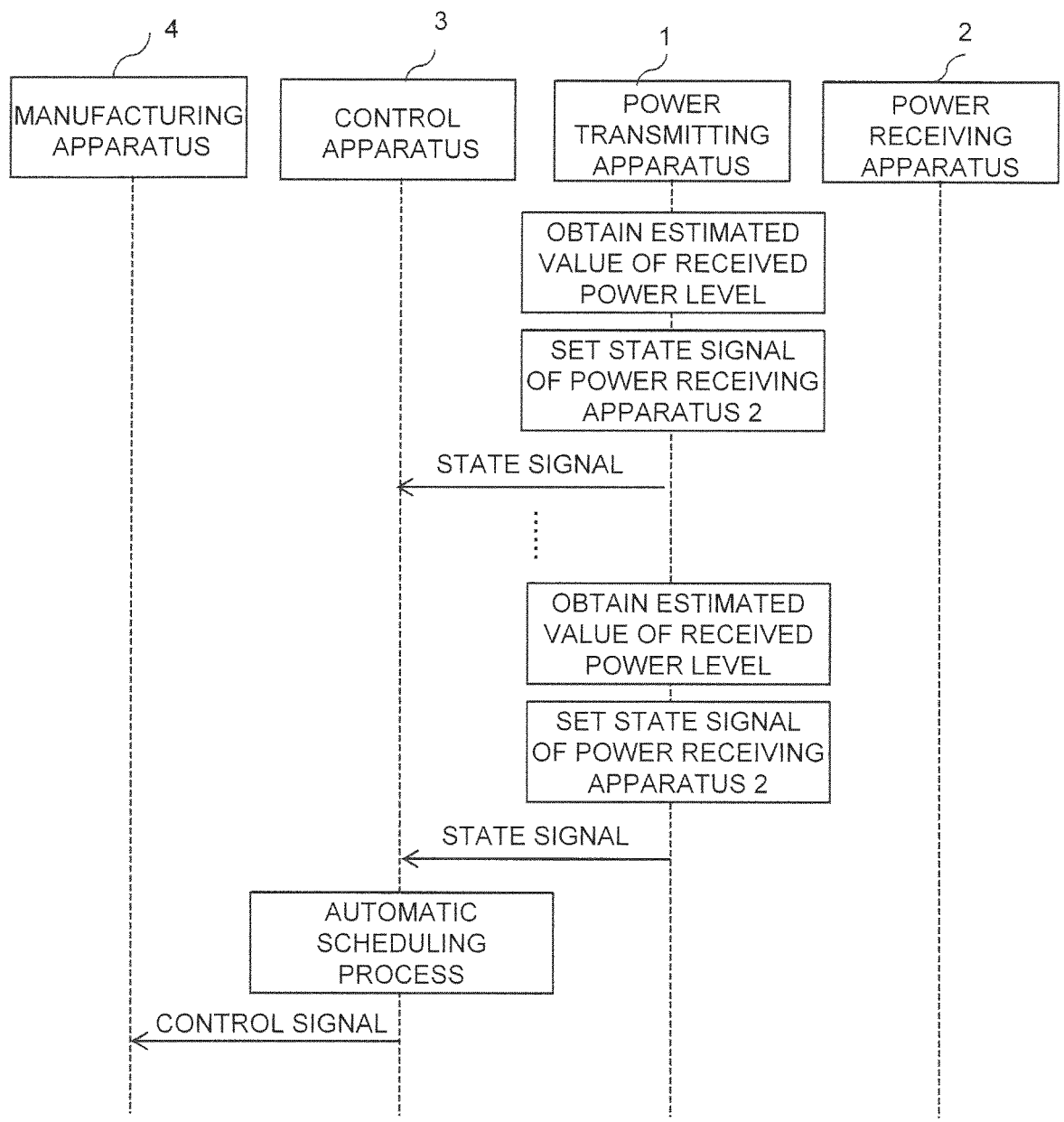
FIG. 9 is a sequence diagram showing a modified embodiment of the operation of the system of FIG. 1.

FIG. 9 is a sequence diagram showing a modified embodiment of the operation of the system of FIG. 1. The system of FIG. 1 repeats the operation of FIG. 7, and therefore, the control apparatus 3 collects the state signals each indicating whether or not the sensor 23 of each of the power receiving apparatuses 2 is operable. Referring to FIG. 9, among the steps of FIG. 7, steps other than those related to generating and transmitting the state signals are omitted for ease of illustration. When the control apparatus 3 collects the state signals of the power receiving apparatuses 2 over a predetermined time length, the control apparatus 3 executes automatic scheduling process based on the collected state signals, for automatically scheduling the operations of the manufacturing apparatus 4. According to the automatic scheduling process, the control apparatus 3 extracts time periods when the sensors 23 are operable, and time periods when the sensor 23 is inoperable, from the collected state signals, and schedules the operations of the manufacturing apparatus 4 so that the manufacturing apparatus 4 operates in the time period when the sensors 23 are operable.

Modified Embodiment of First Embodiment

Figure 10:
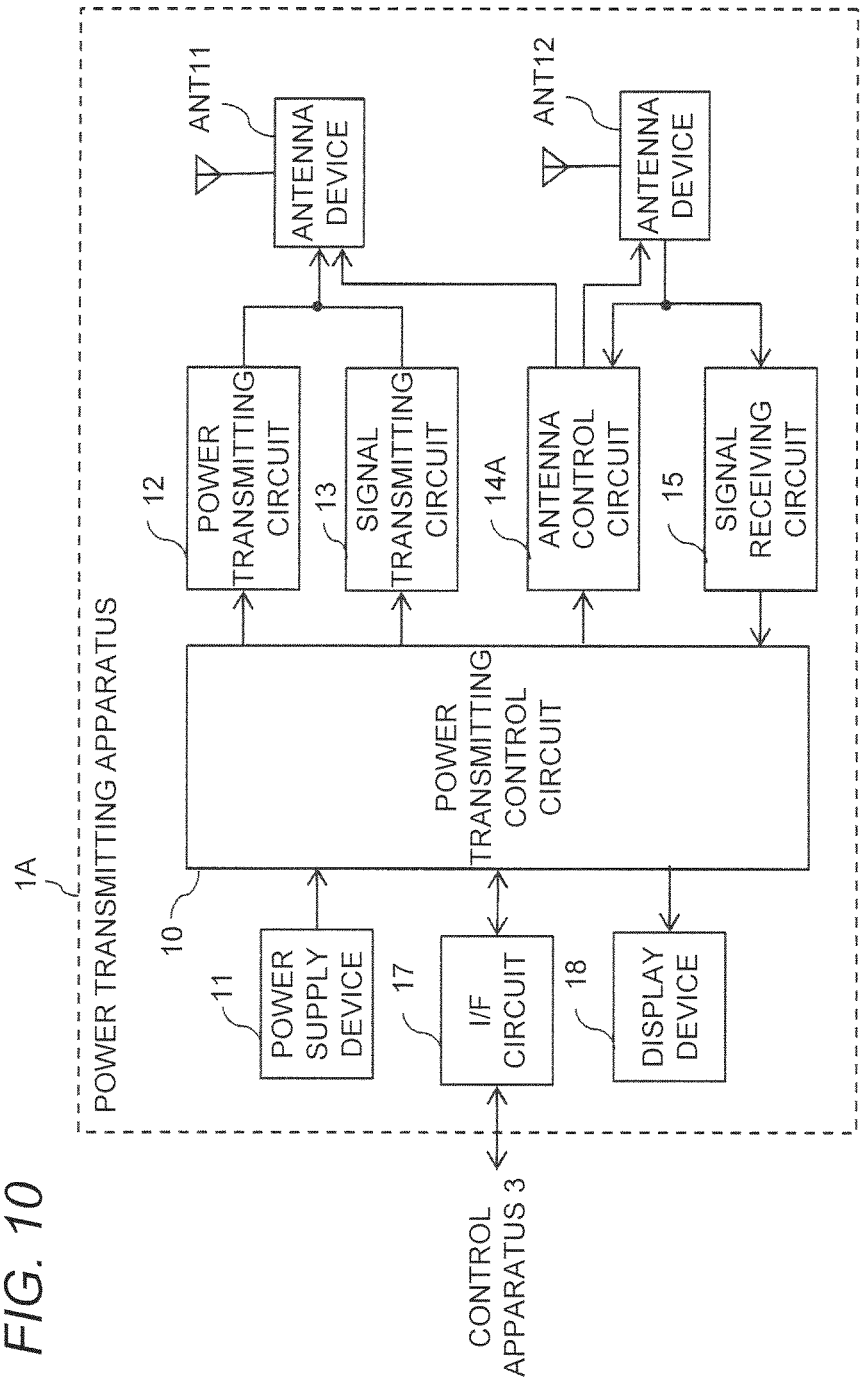
FIG. 10 is a schematic diagram showing a configuration of a wireless power transmitting apparatus 1A of a wireless power transmission system according to a modified embodiment of the first embodiment.

FIG. 10 is a schematic diagram showing a configuration of a power transmitting apparatus 1A of a wireless power transmission system according to a modified embodiment of the first embodiment. The power transmitting apparatus 1A is provided with antenna devices ANT11 and ANT12, and an antenna control circuit 14A, instead of the antenna device ANT1, the antenna control circuit 14, and the circulator 16 of FIG. 2. The separate antenna devices ANT11, ANT12 may be used, instead of sharing the one antenna device ANT1 for transmitting and receiving. The antenna control circuit 14A controls directivities (directional patterns) of the antenna devices ANT11 and ANT12 under control of the power transmitting control circuit 10.

Figure 11:
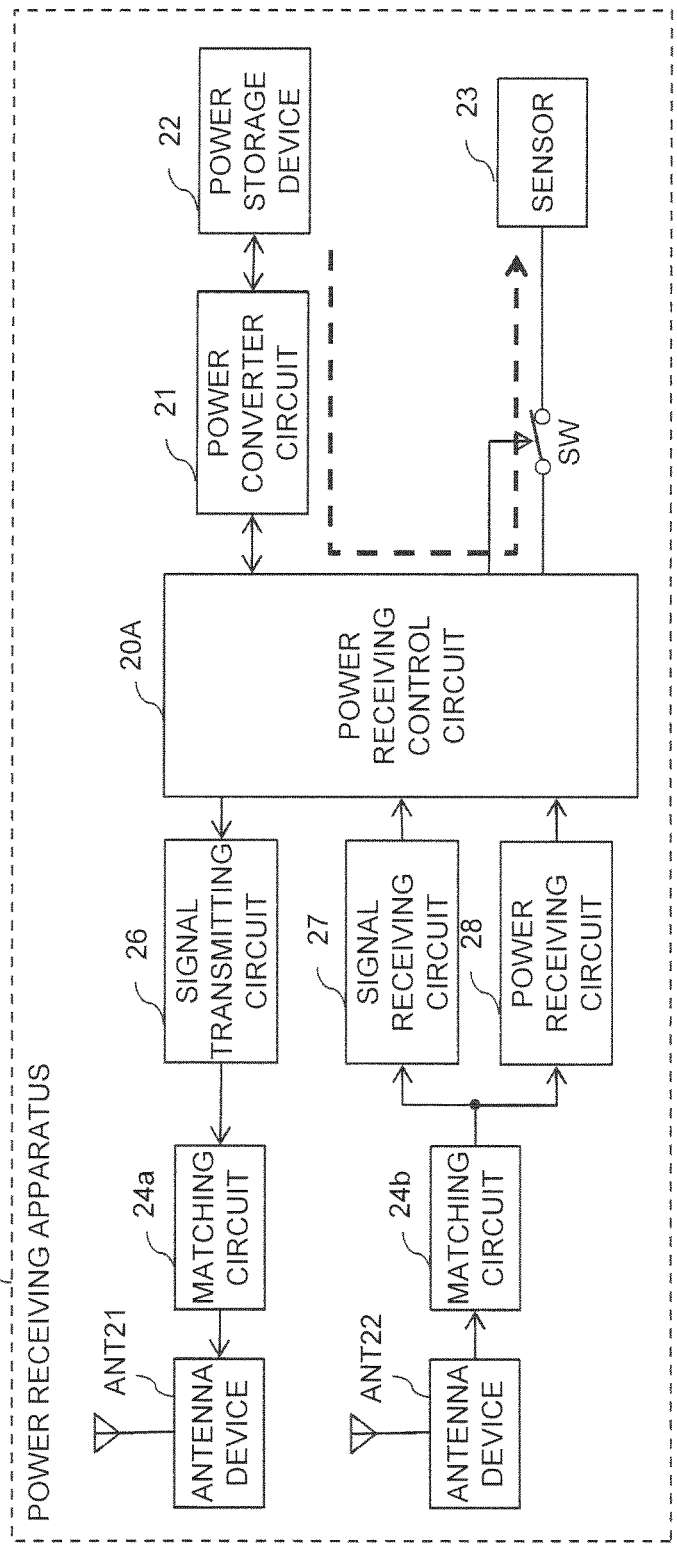
FIG. 11 is a schematic diagram showing a configuration of a wireless power receiving apparatus 2A of a wireless power transmission system according to a modified embodiment of the first embodiment.

FIG. 11 is a schematic diagram showing a configuration of a power receiving apparatus 2A of a wireless power transmission system according to a modified embodiment of the first embodiment. The power receiving apparatus 2A is provided with antenna devices ANT21 and ANT22, a power receiving control circuit 20A, and matching circuits 24a, 24b, instead of the antenna device ANT2, the power receiving control circuit 20, and the matching circuit 24 of FIG. 3. The separate antenna devices ANT21, ANT22 may be used, instead of sharing the one antenna device ANT2 for transmitting and receiving.

Advantageous Effects of First Embodiment

According to the wireless power transmission system of the first embodiment, when the transition occurs from the state where the received power level is smaller than the threshold Th1, to the state where the received power level is equal to or higher than the threshold Th1, the control signal to operate the sensor 23 is transmitted after the standby time Tw has elapsed. At this time, since it is considered that the charging voltage of the power storage device 22 is equal to or higher than the threshold Th2, it is possible to supply the sensor 23 with the power allowing the sensor 23 to operate stably. As a result, it is possible to wirelessly transmit the power from the power transmitting apparatus 1 to the power receiving apparatus 2 so that the sensor 23 is less likely to fail due to power shortage.

According to the wireless power transmission system of the first embodiment, it can be applied to a radio wave propagation environment in which the received power level drops periodically, and also applied to a radio wave propagation environment in which the received power level drops non-periodically.

According to the wireless power transmission system of the first embodiment, the sensor 23 is less likely to fail, and therefore, defects of the products fabricated by the manufacturing apparatus 4 are less likely occur, and a malfunction of the manufacturing apparatus 4 is less likely occur.

According to the wireless power transmission system of the first embodiment, since the control apparatus 3 recognizes whether or not the sensors 23 of the power receiving apparatuses 2 are operable, the control apparatus 3 can operate the manufacturing apparatus 4 in the time period when the sensors 23 are operable, while monitoring the environment around the manufacturing apparatus 4 and the belt conveyor 5. As a result, defects of the products fabricated by the manufacturing apparatus 4 are less likely occur, and a malfunction of the manufacturing apparatus 4 is less likely occur.

According to the wireless power transmission system of the first embodiment, by visualizing the state of the power receiving apparatus 2 (the received power level and the like) using the display device 18, for example, a designer of a production lines of the factory can appropriately determine timing of the operations of the manufacturing apparatus 4, the belt conveyor 5, and the like, in accordance with whether or not the sensors 23 of the power receiving apparatuses 2 are operable (i.e., changes in the radio wave propagation environment).

Second Embodiment

A wireless power transmission system according to a second embodiment will be described with reference to FIGS. 12 to 18.

Application Example of Second Embodiment

The wireless power transmission system according to the second embodiment is configured in a similar manner to that of the wireless power transmission system according to the first embodiment. Therefore, repeated description of the configuration will be omitted.

The power transmitting control circuit 10 periodically allocates a plurality of time slots to the power receiving apparatuses 2, so that in each of the plurality of time slots 2, the power transmitting apparatus 1 wirelessly transmits the power to the power receiving apparatuses 2. When the received power level is smaller than the predetermined threshold Th1 in a first time slot allocated to one of the power receiving apparatuses 2, the power transmitting control circuit 10 extends a second time slot allocated to the same power receiving apparatus 2, the second time slot preceding or following the first time slot.

For example, when an obstacle passes through between the power transmitting apparatus 1 and the power receiving apparatus 2 in a time slot allocated to one of the power receiving apparatuses 2, the radio waves are blocked, the received power level decreases, and the charging voltage of the power storage device 22 also decreases. According to the wireless power transmission system of the second embodiment, another time slot allocated to the same power receiving apparatus 2 is extended in order to compensate for the decrease in the charging voltage. As a result, it is possible to wirelessly transmit the power from the power transmitting apparatus 1 to the power receiving apparatuses 2 so that the sensor 23 is less likely to fail due to power shortage.

Operation Example of Second Embodiment

Figure 12:
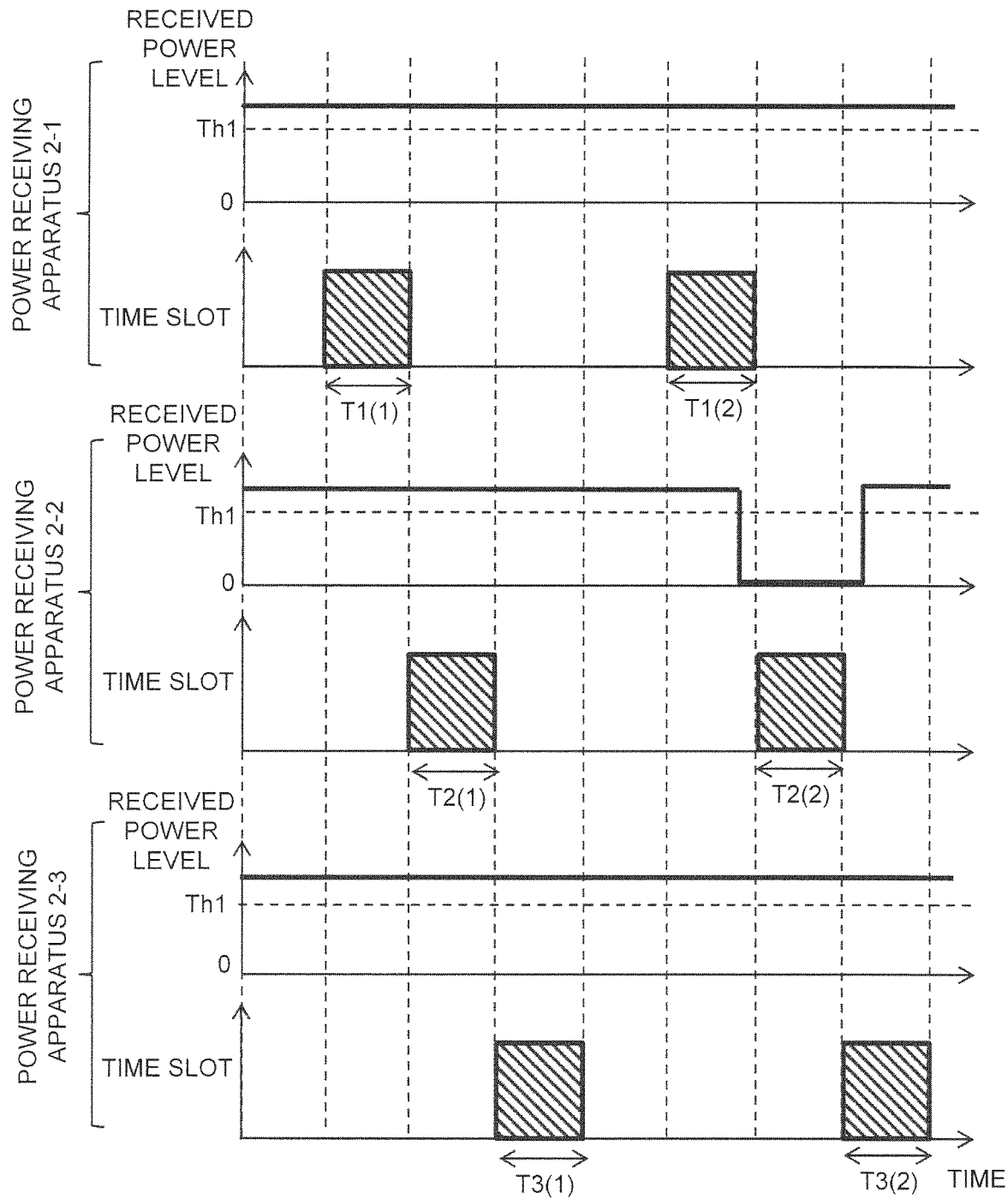
FIG. 12 is a timing chart showing an initial state of time slots allocated to wireless power receiving apparatuses 2-1 to 2-3 of the wireless power transmission system according to a second embodiment.

FIG. 12 is a timing chart showing initial states of the time slots allocated to the power receiving apparatuses 2-1 to 2-3 of the wireless power transmission system according to the second embodiment. In an example of FIG. 12, time slots T1(1), T1(2) are allocated to the power receiving apparatus 2-1, time slots T2(1), T2(2) are allocated to the power receiving apparatus 2-2, and time slots T3(1), T3(2) are allocated to the power receiving apparatus 2-3. In the example of FIG. 12, the received power level of the power receiving apparatus 2-2 becomes smaller than the threshold Th1 in a time interval including the time slot T2(2) allocated to the power receiving apparatus 2-2.

Figure 13:
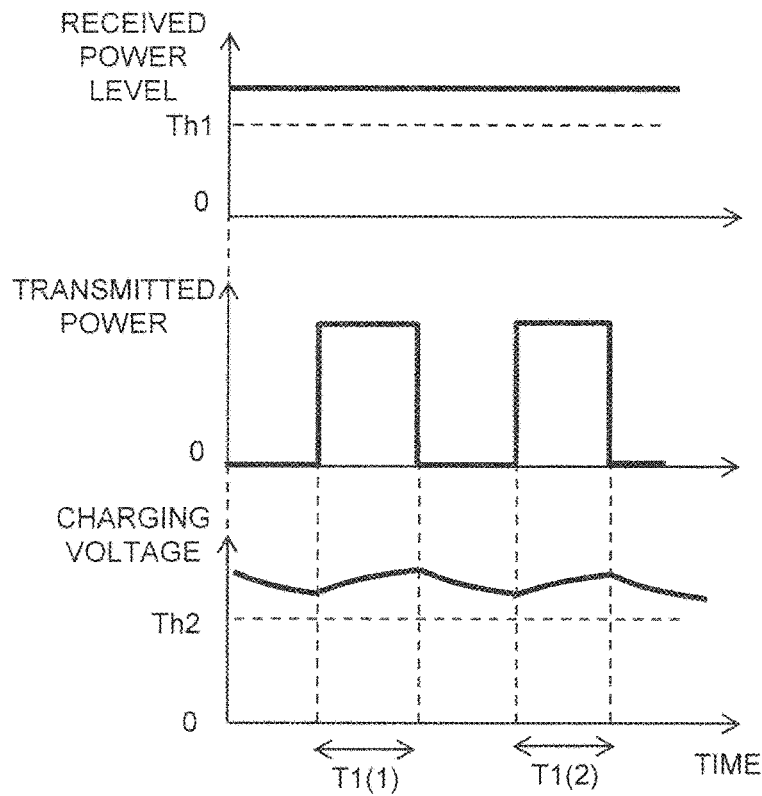
FIG. 13 is a timing chart showing variations in transmitted power and a charging voltage associated with the wireless power receiving apparatus 2-1, in the case where the received power level of the wireless power receiving apparatus 2-1 of FIG. 12 constantly exceeds the threshold Th1.

FIG. 13 is a timing chart showing variations in the transmitted power and the charging voltage associated with the power receiving apparatus 2-1, in the case where the received power level of the power receiving apparatus 2-1 of FIG. 12 constantly exceeds the threshold Th1. In the example of FIG. 13, the charging voltage constantly exceeds the threshold Th2.

Figure 14:
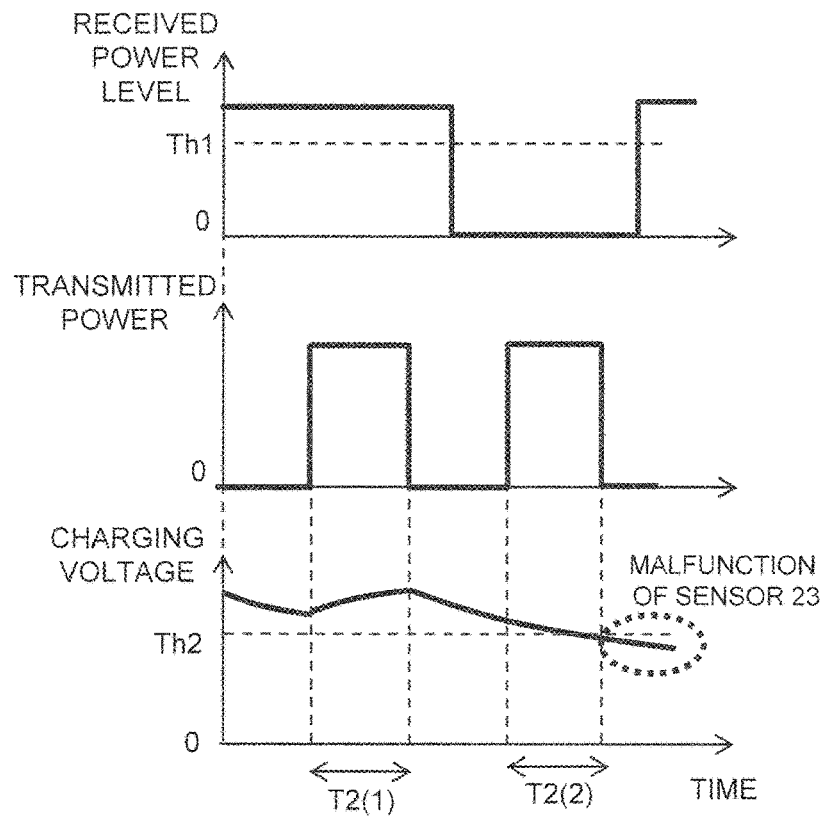
FIG. 14 is a timing chart showing variations in the transmitted power and the charging voltage associated with the wireless power receiving apparatus 2-2, in the case where the received power level of the wireless power receiving apparatus 2-2 of FIG. 12 becomes smaller than the threshold Th1 in a time slot T2(2), but lengths the time slots are not changed.

FIG. 14 is a timing chart showing variations in the transmitted power and the charging voltage associated with the power receiving apparatus 2-2, in the case where the received power level of the power receiving apparatus 2-2 of FIG. 12 becomes smaller than the threshold Th1 in the time slot T2(2), but lengths the time slots are not changed. In the example of FIG. 14, the received power level becomes smaller than the threshold Th1 in the time slot T2(2) allocated to the power receiving apparatus 2-2 (referred to as a "first time slot"), and therefore, the charging voltage becomes smaller than the threshold Th2. This may result in malfunction of the sensor 23.

Figure 15:
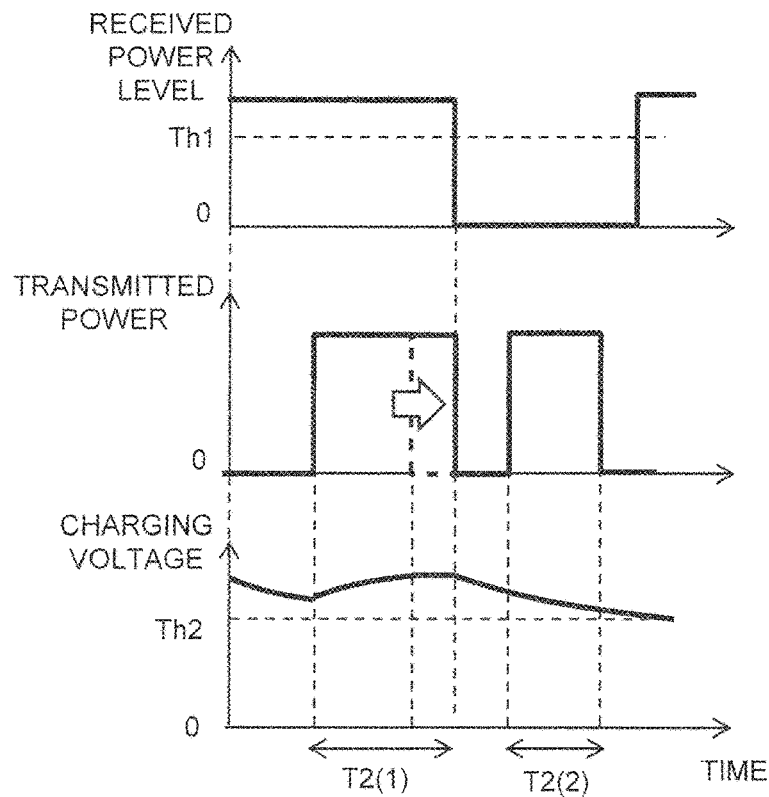
FIG. 15 is a timing chart showing variations in the transmitted power and the charging voltage associated with the wireless power receiving apparatus 2-2, in the case where the received power level of the wireless power receiving apparatus 2-2 of FIG. 12 becomes smaller than the threshold Th1 in the time slot T2(2), and a preceding time slot T2(1) is extended.
Figure 16:
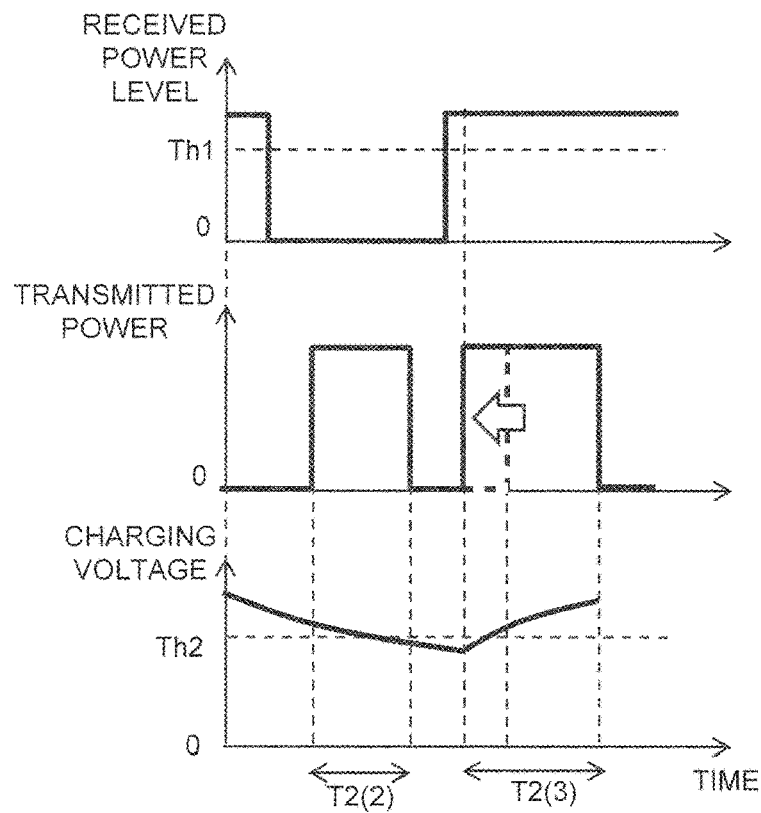
FIG. 16 is a timing chart showing variations in the transmitted power and the charging voltage associated with the wireless power receiving apparatus 2-2, in the case where the received power level of the wireless power receiving apparatus 2-2 of FIG. 12 becomes smaller than the threshold Th1 in the time slot T2(2), and a following time slot T2(3) is extended.

FIG. 15 is a timing chart showing changes of the transmitted power and the charging voltage associated with the power receiving apparatus 2-2, in the case where the received power level of the power receiving apparatus 2-2 of FIG. 12 becomes smaller than the threshold Th1 in the time slot T2(2), and the preceding time slot T2(1) is extended. FIG. 16 is a timing chart showing variations in the transmitted power and the charging voltage associated with the power receiving apparatus 2-2, in the case where the received power level of the power receiving apparatus 2-2 of FIG. 12 becomes smaller than the threshold Th1 in the time slot T2(2), and the following time slot T2(3) is extended. In the examples of FIGS. 15 and 16, in order to compensate for the decrease in the charging voltage, the time slot T2(1) or the time slot T2(3) (referred to as a "second time slot") allocated to the same power receiving apparatus 2-2 is extended, the time slot T2(1) preceding the time slot T2(2), and the time slot T2(3) following the time slot T2(2).

When the received power level of one of the power receiving apparatuses 2 decreases periodically, by extending another time slot allocated to the same power receiving apparatus 2, it is possible to wirelessly transmit the power from the power transmitting apparatus 1 to the power receiving apparatuses 2 so that the sensor 23 is less likely to fail due to power shortage.

Figure 17:
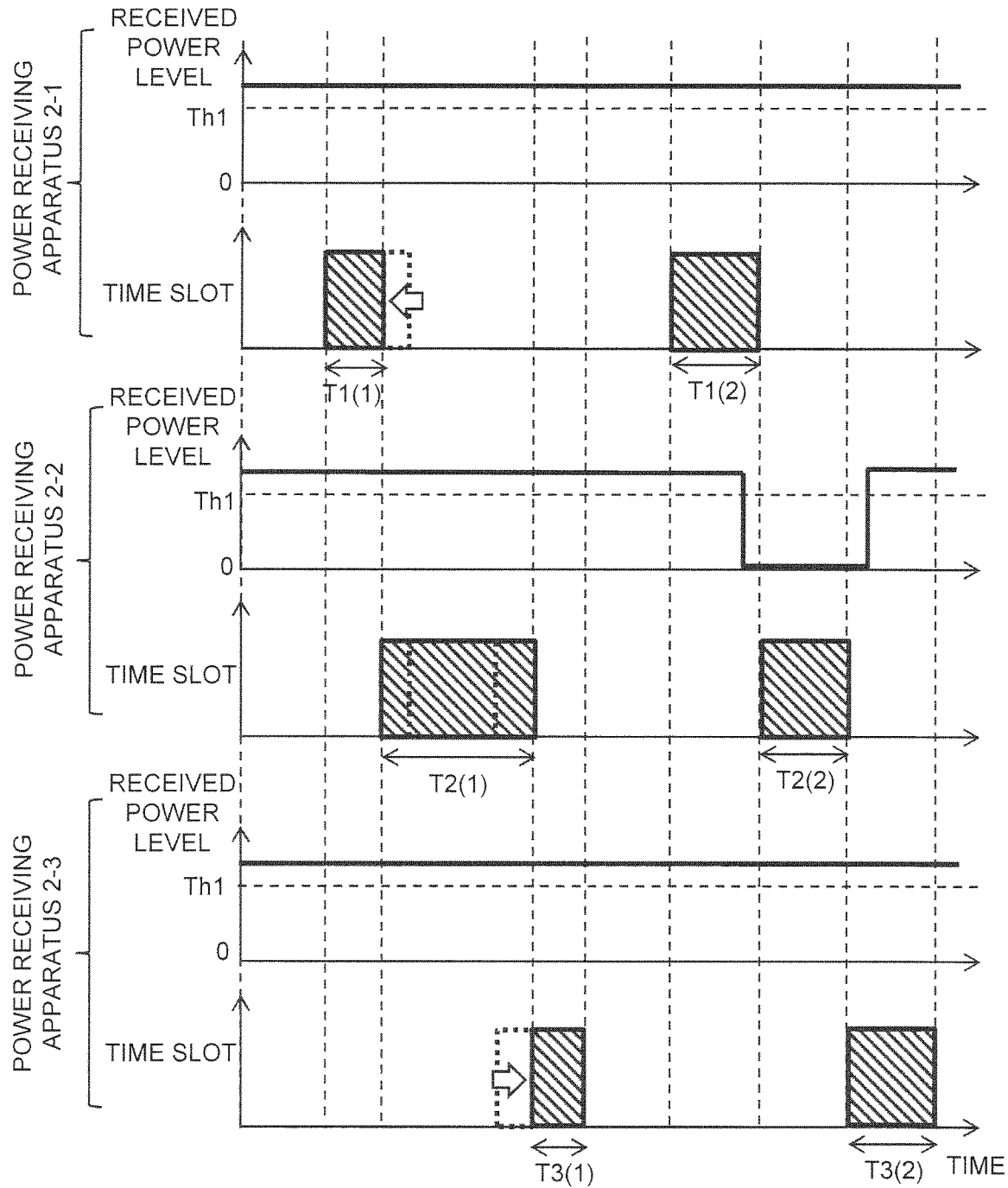
FIG. 17 is a timing chart showing changes in lengths of the time slots allocated to the wireless power receiving apparatuses 2-1 to 2-3, in the case where the received power level of the wireless power receiving apparatus 2-2 of FIG. 12 becomes smaller than the threshold Th1 in the time slot T2(2).

FIG. 17 is a timing chart showing changes in the lengths of the time slots allocated to the power receiving apparatuses 2-1 to 2-3, in the case where the received power level of the power receiving apparatus 2-2 of FIG. 12 becomes smaller than the threshold Th1 in the time slot T2(2). The power transmitting control circuit 10 shortens the time slots T1(1), T3(1) (referred to as "third time slots") allocated to the power receiving apparatuses 2-1, 2-3 different from the power receiving apparatus 2-2 to which the time slots T2(1), T2(2) are allocated, the time slots T1(1), T3(1) being adjacent in time to the time slot T2(1).

Figure 18:
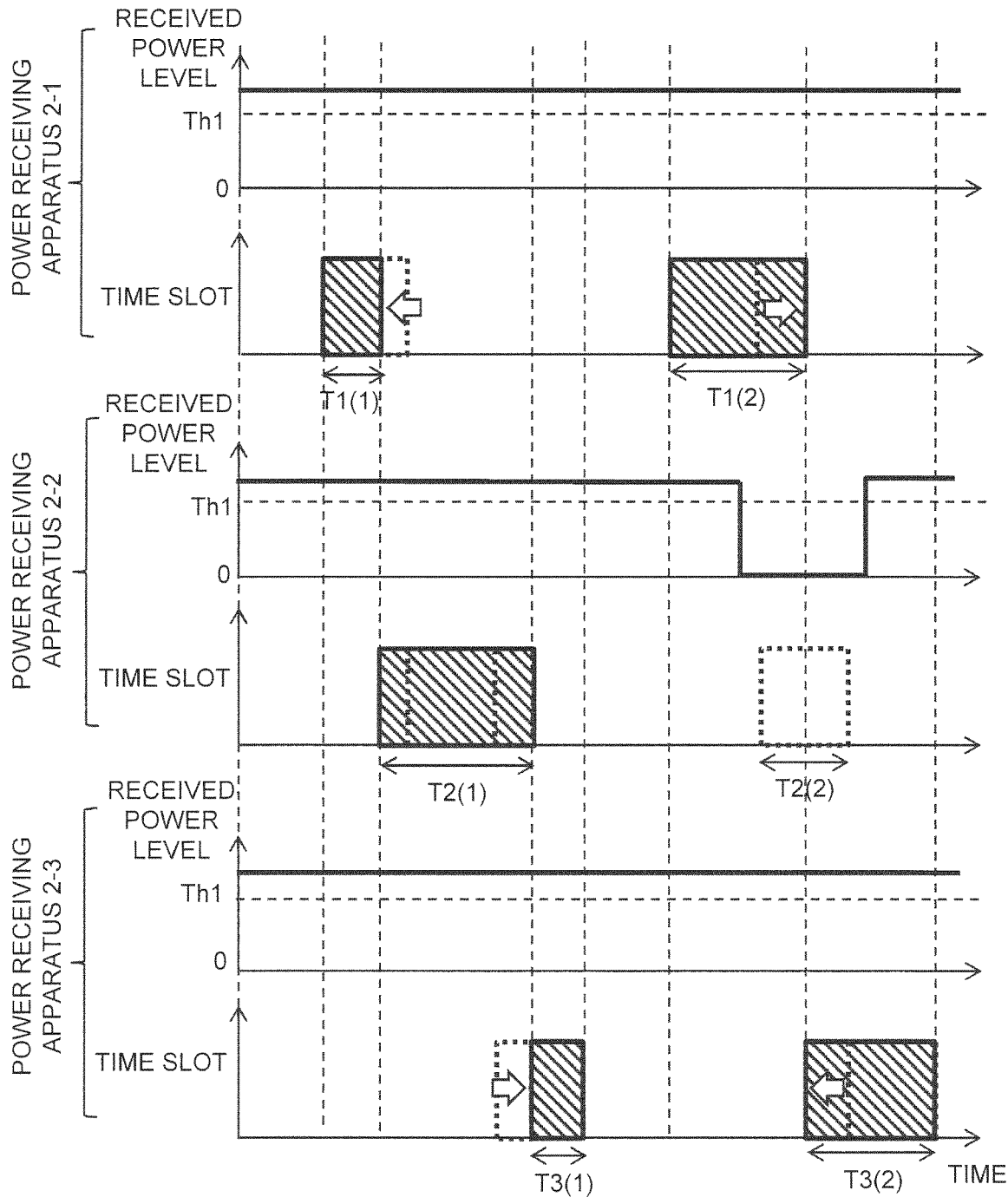
FIG. 18 is a timing chart showing a modified embodiment of changes in the lengths of the time slots allocated to the wireless power receiving apparatuses 2-1 to 2-3, in the case where the received power level of the wireless power receiving apparatus 2-2 of FIG. 12 becomes smaller than the threshold Th1 in the time slot T2(2).

FIG. 18 is a timing chart showing a modified embodiment of changes in the lengths of the time slots allocated to the power receiving apparatuses 2-1 to 2-3, in the case where the received power level of the power receiving apparatus 2-2 of FIG. 12 becomes smaller than the threshold Th1 in the time slot T2(2). The power transmitting control circuit 10 extends the time slots T1(2), T3 (2) (referred to as "fourth time slots") allocated to the power receiving apparatuses 2-1, 2-3 to which the time slots T1(1), T3(1) are allocated, the time slots T1(2), T3 (2) being adjacent in time to the time slot T2(2).

In the examples of FIGS. 17 and 18, power transmission from the power transmitting apparatus 1 to the power receiving apparatus 2-2 may be stopped in the time slot T2(2).

According to FIGS. 17 and 18, by effectively using radio resources for the plurality of power receiving apparatuses 2 it is possible to wirelessly transmit the power from the power transmitting apparatus 1 to the power receiving apparatuses 2 so that the sensor 23 is less likely to fail due to power shortage.

Advantageous Effects of Second Embodiment

According to the wireless power transmission system of the second embodiment, by changing the lengths of the time slots allocated to the power receiving apparatuses 2, it is possible to wirelessly transmit the power from the power transmitting apparatus 1 to the power receiving apparatuses 2 so that the sensor 23 is less likely to fail due to power shortage.

The features of the first embodiment and the features of the second embodiment may be combined with each other. That is, when the received power level becomes smaller than the predetermined threshold Th1 in the first time slot allocated to one of the power receiving apparatuses 2, the power transmitting control circuit 10 may extend the second time slot allocated to the same power receiving apparatus 2, the second time slot preceding or following the first time slot, and further, when the transition occurs from the state where the received power level is smaller than the predetermined threshold Th1, to the state where the received power level is equal to or higher than the predetermined threshold Th1, the power transmitting control circuit 10 may wait for the predetermined standby time Tw, and then, transmit the control signal to operate the sensor 23, using the signal transmitting circuit 13. Thus, it is possible to wirelessly transmit the power from the power transmitting apparatuses 1 to the power receiving apparatus 2 so that the sensor 23 is much less likely to fail due to power shortage.

Modified Embodiments

The antenna device ANT2 of the power receiving apparatus 2 may also have variable directivity (directional pattern).

The display device may be provided in another apparatus, for example, in the control apparatus 3, instead of in the power transmitting apparatus 1.

The power receiving apparatus 2 and the like may be provided with any other load device, instead of or in addition to the sensor 23. The other load device may be, for example, a lighting device, a switch or a relay configured to control other devices, or a signal processing circuit configured to output a signal to other devices. In this case, the power receiving apparatus may control the other load device using the detection result of the sensor 23 as a trigger.

SUMMARY OF EMBODIMENTS

The wireless power transmitting apparatuses and the wireless power transmission systems according to the aspects of the present disclosure may be expressed as follows.

According to the first aspect of the present disclosure, a wireless power transmitting apparatus wirelessly transmits power to at least one wireless power receiving apparatus 2. The wireless power receiving apparatus 2 is provided with a load device configured to operate with power of a power storage device 22. The wireless power transmitting apparatus 1 is provided with: a power transmitting circuit 12 configured to transmit power for operating the load device, to the wireless power receiving apparatus 2; a signal transmitting circuit 13 configured to transmit a control signal to control the load device, to the wireless power receiving apparatus 2; a signal receiving circuit 15 configured to obtain an estimated value of a received power level indicating a level of the power transmitted from the wireless power transmitting apparatus 1 and received by the wireless power receiving apparatus 2; and a power transmitting control circuit 10 configured to control operation of the wireless power transmitting apparatus 1. The power transmitting control circuit 10 periodically allocates a plurality of time slots to the wireless power receiving apparatus 2, so that in each of the plurality of time slots, the wireless power transmitting apparatus 1 wirelessly transmits the power to the wireless power receiving apparatus 2. When the received power level is smaller than a predetermined threshold in a first time slot allocated to one wireless power receiving apparatus 2, the power transmitting control circuit 10 extends a second time slot allocated to the one wireless power receiving apparatus 2, the second time slot preceding or following the first time slot.

According to the second aspect of the present disclosure, in the wireless power transmitting apparatus of the first aspect, in the case where the wireless power transmitting apparatus 1 wirelessly transmits power to a plurality of the wireless power receiving apparatuses 2, the power transmitting control circuit 10 shortens a third time slot allocated to another wireless power receiving apparatus 2 different from the wireless power receiving apparatus 2 to which the first and second time slots are allocated, the third time slot being adjacent in time to the second time slot.

According to the third aspect of the present disclosure, in the wireless power transmitting apparatus of the second aspect, the power transmitting control circuit 10 extends a fourth time slot allocated to a same wireless power receiving apparatus 2 as the wireless power receiving apparatus to which the third time slot is allocated, the fourth time slot being adjacent in time to the first time slot.

According to the fourth aspect of the present disclosure, in the wireless power transmitting apparatus of one of the first to third aspects, when a transition occurs from a state where the received power level is smaller than a predetermined threshold, to a state where the received power level is equal to or higher than the threshold, the power transmitting control circuit 10 waits for a predetermined standby time, and then transmits the control signal using the signal transmitting circuit 13.

According to the fifth aspect of the present disclosure, in the wireless power transmitting apparatus of the fourth aspect, the power transmitting control circuit 10 generates a state signal based on the received power level, the state signal indicating whether or not the load device is operable. The wireless power transmitting apparatus 1 is further provided with an interface circuit 17 configured to output the state signal to an external apparatus.

According to the sixth aspect of the present disclosure, a wireless power transmitting apparatus 1 wirelessly transmits power to at least one wireless power receiving apparatus 2. The wireless power receiving apparatus 2 is provided with a load device configured to operate with power of a power storage device 22. The wireless power transmitting apparatus 1 is provided with: a power transmitting circuit 12 configured to transmit power for operating the load device, to the wireless power receiving apparatus 2; a signal transmitting circuit 13 configured to transmit a control signal to control the load device, to the wireless power receiving apparatus 2; a signal receiving circuit 15 configured to obtain an estimated value of a received power level indicating a level of the power transmitted from the wireless power transmitting apparatus 1 and received by the wireless power receiving apparatus 2; and a power transmitting control circuit 10 configured to control operation of the wireless power transmitting apparatus 1. When a transition occurs from a state where the received power level is smaller than a predetermined threshold, to a state where the received power level is equal to or higher than the threshold, the power transmitting control circuit 10 waits for a predetermined standby time, and then transmits the control signal to operate the load device, using the signal transmitting circuit 13.

According to the seventh aspect of the present disclosure, in the wireless power transmitting apparatus of the sixth aspect, the power transmitting control circuit 10 generates a state signal based on the received power level, the state signal indicating whether or not the load device is operable. The wireless power transmitting apparatus 1 is further provided with an interface circuit 17 configured to output the state signal to an external apparatus.

According to eighth aspect of the present disclosure, a wireless power transmission system is provided with: the wireless power transmitting apparatus 1 of one of the first to seventh aspects; and at least one wireless power receiving apparatus 2 provided with a load device configured to operate with power of a power storage device 22.

According to ninth second aspect of the present disclosure, in the wireless power transmission system of the eighth aspect, the wireless power receiving apparatus 2 is provided with a sensor 23 configured to measure a predetermined physical quantity, and wirelessly transmits the physical quantity measured by the sensor 23, to the wireless power transmitting apparatus 1.

INDUSTRIAL APPLICABILITY

The wireless power transmission system according to the aspect of the present disclosure can be used, for example, to supply power to a plurality of sensors in a sensor network including the sensors.

REFERENCE SIGNS LIST 1, 1A: WIRELESS POWER TRANSMITTING APPARATUS (POWER TRANSMITTING APPARATUS)
2, 2A, 2-1 to 2-3: WIRELESS POWER RECEIVING APPARATUS (POWER RECEIVING APPARATUS)
3: CONTROL APPARATUS
4: MANUFACTURING APPARATUS
5: BELT CONVEYOR
6: PALLET
7: WORKPIECE
10: POWER TRANSMITTING CONTROL CIRCUIT
11: POWER SUPPLY DEVICE
12: POWER TRANSMITTING CIRCUIT
13: SIGNAL TRANSMITTING CIRCUIT
14, 14A: ANTENNA CONTROL CIRCUIT
15: SIGNAL RECEIVING CIRCUIT
16: CIRCULATOR
17: INTERFACE (I/F) CIRCUIT
18: DISPLAY DEVICE
20, 20A: POWER RECEIVING CONTROL CIRCUIT
21: POWER CONVERTER CIRCUIT
22: POWER STORAGE DEVICE
23: SENSOR
24: MATCHING CIRCUIT
25: CIRCULATOR
26: SIGNAL TRANSMITTING CIRCUIT
27: SIGNAL RECEIVING CIRCUIT
28: POWER RECEIVING CIRCUIT
ANT1, ANT2, ANT2A, ANT11 to ANT22: ANTENNA DEVICE
SW: SWITCH

The invention claimed is:

1. A wireless power transmitting apparatus for wirelessly transmitting power to at least one wireless power receiving apparatus, the wireless power receiving apparatus comprising a load device configured to operate with power of a power storage device, the wireless power transmitting apparatus comprising:
a power transmitting circuit configured to transmit power for operating the load device, to the wireless power receiving apparatus;
a signal transmitting circuit configured to transmit a control signal to control the load device, to the wireless power receiving apparatus;
a signal receiving circuit configured to obtain an estimated value of a received power level indicating a level of the power transmitted from the wireless power transmitting apparatus and received by the wireless power receiving apparatus; and
a control circuit configured to control operation of the wireless power transmitting apparatus,
wherein the control circuit periodically allocates a plurality of time slots to the wireless power receiving apparatus, so that in each of the plurality of time slots, the wireless power transmitting apparatus wirelessly transmits the power to the wireless power receiving apparatus, and
wherein, when the received power level is smaller than a predetermined threshold in a first time slot periodically allocated to one wireless power receiving apparatus, the control circuit extends a second time slot periodically allocated to the one wireless power receiving apparatus, the second time slot preceding or following the first time slot.

2. The wireless power transmitting apparatus as claimed in claim 1,
wherein, in the case where the wireless power transmitting apparatus wirelessly transmits power to a plurality of the wireless power receiving apparatuses, the control circuit shortens a third time slot allocated to another wireless power receiving apparatus different from the wireless power receiving apparatus to which the first and second time slots are allocated, the third time slot being adjacent in time to the second time slot.

3. The wireless power transmitting apparatus as claimed in claim 2, wherein the control circuit extends a fourth time slot allocated to a same wireless power receiving apparatus as the wireless power receiving apparatus to which the third time slot is allocated, the fourth time slot being adjacent in time to the first time slot.

4. The wireless power transmitting apparatus as claimed in claim 1,
wherein, when a transition occurs from a state where the received power level is smaller than a predetermined threshold, to a state where the received power level is equal to or higher than the threshold, the control circuit waits for a predetermined standby time, and then transmits the control signal using the signal transmitting circuit.

5. The wireless power transmitting apparatus as claimed in claim 4,
wherein the control circuit generates a state signal based on the received power level, the state signal indicating whether or not the load device is operable, and
wherein the wireless power transmitting apparatus further comprises an interface circuit configured to output the state signal to an external apparatus.

6. A wireless power transmission system comprising:
a wireless power transmitting apparatus; and
at least one wireless power receiving apparatus comprising a load device configured to operate with power of a power storage device,
wherein the wireless power transmitting apparatus comprising:
a power transmitting circuit configured to transmit power for operating the load device, to the wireless power receiving apparatus;
a signal transmitting circuit configured to transmit a control signal to control the load device, to the wireless power receiving apparatus;
a signal receiving circuit configured to obtain an estimated value of a received power level indicating a level of the power transmitted from the wireless power transmitting apparatus and received by the wireless power receiving apparatus; and
a control circuit configured to control operation of the wireless power transmitting apparatus,
wherein the control circuit periodically allocates a plurality of time slots to the wireless power receiving apparatus, so that in each of the plurality of time slots, the wireless power transmitting apparatus wirelessly transmits the power to the wireless power receiving apparatus, and
wherein, when the received power level is smaller than a predetermined threshold in a first time slot periodically allocated to one wireless power receiving apparatus, the control circuit extends a second time slot periodically allocated to the one wireless power receiving apparatus, the second time slot preceding or following the first time slot.

7. The wireless power transmission system as claimed in claim 6,
wherein the wireless power receiving apparatus comprises a sensor configured to measure a predetermined physical quantity, and wirelessly transmits the physical quantity measured by the sensor, to the wireless power transmitting apparatus.

* * * * *